United States Patent
Yuan et al.

(10) Patent No.: US 12,490,202 B2
(45) Date of Patent: Dec. 2, 2025

(54) TRANSMIT POWER PRIORITIZATION FOR MULTI-PANEL UPLINK TRANSMISSION

(71) Applicant: QUALCOMM INCORPORATED, San Diego, CA (US)

(72) Inventors: Fang Yuan, Beijing (CN); Yan Zhou, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/999,764

(22) PCT Filed: Jul. 23, 2020

(86) PCT No.: PCT/CN2020/103725
§ 371 (c)(1),
(2) Date: Nov. 23, 2022

(87) PCT Pub. No.: WO2022/016440
PCT Pub. Date: Jan. 27, 2022

(65) Prior Publication Data
US 2023/0217378 A1    Jul. 6, 2023

(51) Int. Cl.
*H04W 52/34* (2009.01)
*H04W 52/14* (2009.01)
(Continued)

(52) U.S. Cl.
CPC ....... *H04W 52/346* (2013.01); *H04W 52/146* (2013.01); *H04W 52/281* (2013.01); *H04W 52/367* (2013.01)

(58) Field of Classification Search
CPC ............. H04W 52/346; H04W 52/146; H04W 52/281; H04W 52/367
See application file for complete search history.

(56) References Cited

U.S. PATENT DOCUMENTS

2019/0349915 A1    11/2019 Ahn et al.
2020/0092860 A1    3/2020 Khoshnevisan et al.
(Continued)

FOREIGN PATENT DOCUMENTS

| CN | 110224802 A | 9/2019 |
| CN | 110612751 A | 12/2019 |
| WO | WO-2019126063 A1 | 6/2019 |

OTHER PUBLICATIONS

LG Electronics: "Feature Lead Summary of Enhancements on Multi-Beam Operations", 3GPP TSG RAN WG1 Ad-Hoc Meeting 1901, R1-1901348 R1_AH1901, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 21, 2019, Jan. 23, 2019, 31 Pages, XP051594124, Section 3.4, R1-1900388, proposals 3-4, p. 26.
(Continued)

*Primary Examiner* — John J Lee
(74) *Attorney, Agent, or Firm* — Holland & Hart LLP

(57) ABSTRACT

Methods, systems, and devices for wireless communications are described. A user equipment (UE) may determine that a multi-panel uplink transmission is to be performed by the UE, the multi-panel uplink transmission using at least a first transmit panel and a second transmit panel of the UE. The UE may identify a priority order for performing uplink transmissions of the multi-panel uplink transmission from the UE, the priority order including priority levels associated with the first transmit panel and the second transmit panel. The UE may identify an available transmit power for the multi-panel uplink transmission. The UE may perform, according to the priority order, the multi-panel uplink transmission using at least the first transmit panel at a first transmit power and the second transmit panel at a second transmit power, the first transmit power and the second
(Continued)

transmit power based at least in part on the available transmit power.

29 Claims, 18 Drawing Sheets

(51) Int. Cl.
*H04W 52/28* (2009.01)
*H04W 52/36* (2009.01)

(56) References Cited

U.S. PATENT DOCUMENTS

| | | | |
|---|---|---|---|
| 2020/0229104 A1* | 7/2020 | MolavianJazi | H04W 52/54 |
| 2021/0068142 A1* | 3/2021 | Park | H04W 72/0453 |
| 2023/0078181 A1* | 3/2023 | Ghanbarinejad | H04W 52/325 |
| | | | 370/318 |

OTHER PUBLICATIONS

Supplementary European Search Report—EP20945795—Search Authority—The Hague—Mar. 19, 2024.
ZTE Corporation: "Discussion on Prioritization for Transmission Power Scaling for DC", 3GPP TSG RAN WG1 Meeting #96bis, R1-1904760, 3rd Generation Partnership Project, Mobile Competence Centre, 650, Route Des Lucioles, F-06921 Sophia-Antipolis Cedex, vol. RAN WG1, No. Xi'an, China, Apr. 8, 2019-Apr. 12, 2019, Mar. 30, 2019, 3 Pages, XP051691746, Section 1-2.
International Search Report and Written Opinion—PCT/CN2020/103725—ISA/EPO—Apr. 16, 2021.

* cited by examiner

TRANSMIT POWER PRIORITIZATION FOR MULTI-PANEL UPLINK TRANSMISSION

CROSS REFERENCE

The present application is a 371 national stage filing of International PCT Application No. PCT/CN2020/103725 by YUAN et al. entitled "TRANSMIT POWER PRIORITIZATION FOR MULTI-PANEL UPLINK TRANSMISSION," filed Jul. 23, 2020, which is assigned to the assignee hereof, and which is expressly incorporated by reference in its entirety herein.

FIELD OF TECHNOLOGY

The following relates to wireless communications, including transmit power prioritization for multi-panel uplink transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support transmit power prioritization for multi-panel uplink transmission. Generally, the described techniques provide for allocation available transmit power using prioritization considerations on a per-transmit panel basis for a user equipment (UE). For example, the UE and its associated base station may determine that the UE is to perform a multi-panel uplink transmission using two or more transmit panels (e.g., a first transmit panel, a second transmit panel, and so forth) of the UE. The UE and associated base station may identify a priority order for performing the uplink transmissions of the multi-panel uplink transmission, wherein the transmit panels of the UE have corresponding priority levels configured for each panel. The UE and associated base station may also identify or otherwise determine the available transmit power for the multi-panel uplink transmission and perform the transmission according to the priority order and available transmit power. For example, the UE may use the first transmit panel at a first transmit power and the second transmit panel at a second transmit power that are based on the available transmit power for the multi-panel uplink transmission. Accordingly, the UE and associated base station may enable per-transmit panel priority considerations when allocating available transmit power for a multi-panel uplink transmission from the UE to the base station.

A method of wireless communication at a UE is described. The method may include determining that a multi-panel uplink transmission is to be performed by the UE, the multi-panel uplink transmission using at least a first transmit panel and a second transmit panel of the UE, identifying a priority order for performing uplink transmissions of the multi-panel uplink transmission from the UE, the priority order including priority levels associated with the first transmit panel and the second transmit panel, identifying an available transmit power for the multi-panel uplink transmission, and performing, according to the priority order, the multi-panel uplink transmission using at least the first transmit panel at a first transmit power and the second transmit panel at a second transmit power, the first transmit power and the second transmit power based on the available transmit power.

An apparatus for wireless communication at a UE is described. The apparatus may include a processor, memory coupled with the processor, and instructions stored in the memory. The instructions may be executable by the processor to cause the apparatus to determine that a multi-panel uplink transmission is to be performed by the UE, the multi-panel uplink transmission using at least a first transmit panel and a second transmit panel of the UE, identify a priority order for performing uplink transmissions of the multi-panel uplink transmission from the UE, the priority order including priority levels associated with the first transmit panel and the second transmit panel, identify an available transmit power for the multi-panel uplink transmission, and perform, according to the priority order, the multi-panel uplink transmission using at least the first transmit panel at a first transmit power and the second transmit panel at a second transmit power, the first transmit power and the second transmit power based on the available transmit power.

Another apparatus for wireless communication at a UE is described. The apparatus may include means for determining that a multi-panel uplink transmission is to be performed by the UE, the multi-panel uplink transmission using at least a first transmit panel and a second transmit panel of the UE, identifying a priority order for performing uplink transmissions of the multi-panel uplink transmission from the UE, the priority order including priority levels associated with the first transmit panel and the second transmit panel, identifying an available transmit power for the multi-panel uplink transmission, and performing, according to the priority order, the multi-panel uplink transmission using at least the first transmit panel at a first transmit power and the second transmit panel at a second transmit power, the first transmit power and the second transmit power based on the available transmit power.

A non-transitory computer-readable medium storing code for wireless communication at a UE is described. The code may include instructions executable by a processor to determine that a multi-panel uplink transmission is to be performed by the UE, the multi-panel uplink transmission using at least a first transmit panel and a second transmit panel of the UE, identify a priority order for performing uplink transmissions of the multi-panel uplink transmission from the UE, the priority order including priority levels associated with the first transmit panel and the second transmit panel, identify an available transmit power for the multi-panel uplink transmission, and perform, according to the priority order, the multi-panel uplink transmission using at least the first transmit panel at a first transmit power and the second transmit panel at a second transmit power, the first transmit power and the second transmit power based on the available transmit power.

Some examples of the method, apparatuses, and non-transitory computer-readable medium described herein may further include operations, features, means, or instructions for receiving a configuration signal indicating a first available transmit power for the first transmit panel and a second available transmit power for the second transmit panel, the first transmit power based on the first available transmit power and the second transmit power based on the second available transmit power, and the available transmit power including the first available transmit power and the second available transmit power.

Some examples of the method, apparatuses, and non-transitory computer-readable medium described herein may further include operations, features, means, or instructions for determining that the first transmit power exceeds the first available transmit power for the first transmit panel, identifying that a first priority of a first transmission type for the first uplink transmission on the first transmit panel may be a higher priority than a second priority of a second transmission type for a second uplink transmission on the first transmit panel, and transmitting the first transmission type of the first uplink transmission on the first transmit panel and dropping the second uplink transmission on the first transmit panel.

In some examples of the method, apparatuses, and non-transitory computer-readable medium described herein, the configuration signal may be received in a transmission from a base station to the UE or a signal transmitted from an upper layer of the UE to a lower layer of the UE.

Some examples of the method, apparatuses, and non-transitory computer-readable medium described herein may further include operations, features, means, or instructions for receiving a configuration signal indicating a shared available transmit power for the multi-panel uplink transmission, the first transmit power and the second transmit power based at least part on the shared available transmit power, the available transmit power including the shared available transmit power.

Some examples of the method, apparatuses, and non-transitory computer-readable medium described herein may further include operations, features, means, or instructions for transmitting, based on the shared available transmit power, a first uplink transmission of the multi-panel uplink transmission on the first transmit panel using the first transmit power and a second uplink transmission of the multi-panel uplink transmission on the second transmit panel using the second transmit power.

Some examples of the method, apparatuses, and non-transitory computer-readable medium described herein may further include operations, features, means, or instructions for identifying, based on the priority order, that a first priority of the first transmit panel may be a higher priority than a second priority of the second transmit panel, where the prioritizing may be based on the first priority of the first transmit panel being a higher priority than the second priority of the second transmit panel.

Some examples of the method, apparatuses, and non-transitory computer-readable medium described herein may further include operations, features, means, or instructions for identifying a first identifier for the first transmit panel and a second identifier for the second transmit panel, where the prioritizing of the first uplink transmission on the first transmit panel may be based on the first identifier for the first transmit panel being associated with a higher priority than the second identifier for the second transmit panel.

Some examples of the method, apparatuses, and non-transitory computer-readable medium described herein may further include operations, features, means, or instructions for identifying, based on the priority order, a first priority of a first transmission type for the first uplink transmission on the first transmit panel that may be a higher priority than a second priority of a second transmission type for a first uplink transmission on the first transmit panel, the prioritizing based on the first priority of the first transmission type being a higher priority than the second priority of the second transmission type.

In some examples of the method, apparatuses, and non-transitory computer-readable medium described herein, the configuration signal may be received in a transmission from a base station to the UE or a signal transmitted from an upper layer of the UE to a lower layer of the UE.

Some examples of the method, apparatuses, and non-transitory computer-readable medium described herein may further include operations, features, means, or instructions for transmitting, based on the priority order, a first uplink transmission of the multi-panel uplink transmission on the first transmit panel using the first transmit power and a second uplink transmission of the multi-panel uplink transmission on the second transmit panel using the second transmit power.

Some examples of the method, apparatuses, and non-transitory computer-readable medium described herein may further include operations, features, means, or instructions for identifying, based on the priority order, a first priority of the first uplink transmission that may be a higher priority than a second priority of the second uplink transmission, the prioritizing based on the first priority of the first uplink transmission and the second priority of the second uplink transmission.

Some examples of the method, apparatuses, and non-transitory computer-readable medium described herein may further include operations, features, means, or instructions for identifying a first identifier for the first transmit panel that may be associated with a first priority and a second identifier for the second transmit panel that may be associated with a second priority, the first priority being a higher priority than the second priority, identifying a first transmission type for the first uplink transmission on the first transmit panel and a second transmission type for the second uplink transmission on the second transmit panel, the first transmission type associated with a lower priority than the second transmission type, and transmitting, based on the lower priority of the second transmission type, the second transmission type for the second uplink transmission on the second transmit panel and dropping the first transmission type for the first uplink transmission on the first transmit panel.

Some examples of the method, apparatuses, and non-transitory computer-readable medium described herein may further include operations, features, means, or instructions for identifying, based on the priority order, a first priority of a first transmission type for the first uplink transmission that may be a higher priority than a second priority of a second transmission type for the second uplink transmission, the prioritizing based on the first priority of the first transmission type and the second priority of the second transmission type.

Some examples of the method, apparatuses, and non-transitory computer-readable medium described herein may further include operations, features, means, or instructions for identifying a first identifier for the first transmit panel that may be associated with a first priority and a second identifier for the second transmit panel that may be associated with a second priority, the first priority being a higher priority than the second priority, identifying a first transmission type for the first uplink transmission on the first transmit panel and a second transmission type for the second uplink transmission on the second transmit panel, the first transmission type associated with a lower priority than the second transmission type, and transmitting, based on the lower priority of the second transmission type, the second transmission type for the second uplink transmission on the second transmit panel and dropping the first transmission type for the first uplink transmission on the first transmit panel.

In some examples of the method, apparatuses, and non-transitory computer-readable medium described herein, the multi-panel uplink transmission includes one or more of a sounding reference signal (SRS) transmission, a physical uplink control channel (PUCCH) transmission, a physical uplink shared channel (PUSCH) transmission, a physical random access channel (PRACH) transmission, or a combination thereof.

In some examples of the method, apparatuses, and non-transitory computer-readable medium described herein, the PUCCH transmission indicates at least one of a hybrid automatic repeat/request acknowledgement (HARQ-ACK) information, a scheduling request (SR), a channel state information (CSI), a long-range radar (LRR) information, of a combination thereof, and the PUSCH transmission includes at least of the CSI, the HARQ-ACK information, or a combination thereof.

In some examples of the method, apparatuses, and non-transitory computer-readable medium described herein, performing the multi-panel uplink transmission may include operations, features, means, or instructions for transmitting a first uplink transmission of the multi-panel uplink transmission using the first transmit panel of the UE and a second uplink transmission of the multi-panel uplink transmission using the second transmit panel of the UE.

In some examples of the method, apparatuses, and non-transitory computer-readable medium described herein, receiving the multi-panel uplink transmission may include operations, features, means, or instructions for receiving a first uplink transmission of the multi-panel uplink transmission using the first transmit panel of the UE and a second uplink transmission of the multi-panel uplink transmission using the second transmit panel of the UE.

A method of wireless communication at a base station is described. The method may include determining that a multi-panel uplink transmission is to be performed to the base station from a UE, the multi-panel uplink transmission using at least a first transmit panel and a second transmit panel of the UE, identifying a priority order for the UE to use for performing uplink transmissions of the multi-panel uplink transmission from the UE, the priority order including priority levels associated with the first transmit panel and the second transmit panel, identifying an available transmit power of the UE for the multi-panel uplink transmission, and receiving, according to the priority order, the multi-panel uplink transmission from the UE using at least the first transmit panel at a first transmit power and the second transmit panel at a second transmit power, the first transmit power and the second transmit power based on the available transmit power.

An apparatus for wireless communication at a base station is described. The apparatus may include a processor, memory coupled with the processor, and instructions stored in the memory. The instructions may be executable by the processor to cause the apparatus to determine that a multi-panel uplink transmission is to be performed to the base station from a UE, the multi-panel uplink transmission using at least a first transmit panel and a second transmit panel of the UE, identify a priority order for the UE to use for performing uplink transmissions of the multi-panel uplink transmission from the UE, the priority order including priority levels associated with the first transmit panel and the second transmit panel, identify an available transmit power of the UE for the multi-panel uplink transmission, and receive, according to the priority order, the multi-panel uplink transmission from the UE using at least the first transmit panel at a first transmit power and the second transmit panel at a second transmit power, the first transmit power and the second transmit power based on the available transmit power.

Another apparatus for wireless communication at a base station is described. The apparatus may include means for determining that a multi-panel uplink transmission is to be performed to the base station from a UE, the multi-panel uplink transmission using at least a first transmit panel and a second transmit panel of the UE, identifying a priority order for the UE to use for performing uplink transmissions of the multi-panel uplink transmission from the UE, the priority order including priority levels associated with the first transmit panel and the second transmit panel, identifying an available transmit power of the UE for the multi-panel uplink transmission, and receiving, according to the priority order, the multi-panel uplink transmission from the UE using at least the first transmit panel at a first transmit power and the second transmit panel at a second transmit power, the first transmit power and the second transmit power based on the available transmit power.

A non-transitory computer-readable medium storing code for wireless communication at a base station is described. The code may include instructions executable by a processor to determine that a multi-panel uplink transmission is to be performed to the base station from a UE, the multi-panel uplink transmission using at least a first transmit panel and a second transmit panel of the UE, identify a priority order for the UE to use for performing uplink transmissions of the multi-panel uplink transmission from the UE, the priority order including priority levels associated with the first transmit panel and the second transmit panel, identify an available transmit power of the UE for the multi-panel uplink transmission, and receive, according to the priority order, the multi-panel uplink transmission from the UE using at least the first transmit panel at a first transmit power and the second transmit panel at a second transmit power, the first transmit power and the second transmit power based on the available transmit power.

Some examples of the method, apparatuses, and non-transitory computer-readable medium described herein may further include operations, features, means, or instructions for transmitting a configuration signal indicating a first available transmit power for the first transmit panel and a second available transmit power for the second transmit panel, the first transmit power based on the first available transmit power and the second transmit power based on the second available transmit power, and the available transmit power including the first available transmit power and the second available transmit power.

Some examples of the method, apparatuses, and non-transitory computer-readable medium described herein may further include operations, features, means, or instructions for determining that the first transmit power exceeds the first available transmit power for the first transmit panel, identifying that a first priority of a first transmission type for the first uplink transmission on the first transmit panel may be a higher priority than a second priority of a second transmission type for a second uplink transmission on the first transmit panel, and receiving the first transmission type of the first uplink transmission on the first transmit panel, where the UE drops the second uplink transmission on the first transmit panel.

Some examples of the method, apparatuses, and non-transitory computer-readable medium described herein may further include operations, features, means, or instructions for transmitting a configuration signal indicating a shared available transmit power for the multi-panel uplink transmission, the first transmit power and the second transmit power based at least part on the shared available transmit power, the available transmit power including the shared available transmit power.

Some examples of the method, apparatuses, and non-transitory computer-readable medium described herein may further include operations, features, means, or instructions for transmitting, based on the shared available transmit power, a first uplink transmission of the multi-panel uplink transmission on the first transmit panel using the first transmit power and a second uplink transmission of the multi-panel uplink transmission on the second transmit panel using the second transmit power.

Some examples of the method, apparatuses, and non-transitory computer-readable medium described herein may further include operations, features, means, or instructions for identifying, based on the priority order, that a first priority of the first transmit panel may be a higher priority than a second priority of the second transmit panel, where the prioritizing may be based on the first priority of the first transmit panel being a higher priority than the second priority of the second transmit panel.

Some examples of the method, apparatuses, and non-transitory computer-readable medium described herein may further include operations, features, means, or instructions for identifying a first identifier for the first transmit panel and a second identifier for the second transmit panel, where the prioritizing of the first uplink transmission on the first transmit panel may be based on the first identifier for the first transmit panel being associated with a higher priority than the second identifier for the second transmit panel.

Some examples of the method, apparatuses, and non-transitory computer-readable medium described herein may further include operations, features, means, or instructions for identifying, based on the priority order, a first priority of a first transmission type for the first uplink transmission on the first transmit panel that may be a higher priority than a second priority of a second transmission type for a first uplink transmission on the first transmit panel, the prioritizing based on the first priority of the first transmission type being a higher priority than the second priority of the second transmission type.

Some examples of the method, apparatuses, and non-transitory computer-readable medium described herein may further include operations, features, means, or instructions for receiving, based on the priority order, a first uplink transmission of the multi-panel uplink transmission on the first transmit panel using the first transmit power and a second uplink transmission of the multi-panel uplink transmission on the second transmit panel using the second transmit power.

Some examples of the method, apparatuses, and non-transitory computer-readable medium described herein may further include operations, features, means, or instructions for identifying, based on the priority order, a first priority of the first uplink transmission that may be a higher priority than a second priority of the second uplink transmission, the prioritizing based on the first priority of the first uplink transmission and the second priority of the second uplink transmission.

Some examples of the method, apparatuses, and non-transitory computer-readable medium described herein may further include operations, features, means, or instructions for identifying a first identifier for the first transmit panel that may be associated with a first priority and a second identifier for the second transmit panel that may be associated with a second priority, the first priority being a higher priority than the second priority, identifying a first transmission type for the first uplink transmission on the first transmit panel and a second transmission type for the second uplink transmission on the second transmit panel, the first transmission type associated with a lower priority than the second transmission type, and receiving, based on the lower priority of the second transmission type, the second transmission type for the second uplink transmission on the second transmit panel, where the UE drops the first transmission type for the first uplink transmission on the first transmit panel.

Some examples of the method, apparatuses, and non-transitory computer-readable medium described herein may further include operations, features, means, or instructions for identifying, based on the priority order, a first priority of a first transmission type for the first uplink transmission that may be a higher priority than a second priority of a second transmission type for the second uplink transmission, the prioritizing based on the first priority of the first transmission type and the second priority of the second transmission type.

Some examples of the method, apparatuses, and non-transitory computer-readable medium described herein may further include operations, features, means, or instructions for identifying a first identifier for the first transmit panel that may be associated with a first priority and a second identifier for the second transmit panel that may be associated with a second priority, the first priority being a higher priority than the second priority, identifying a first transmission type for the first uplink transmission on the first transmit panel and a second transmission type for the second uplink transmission on the second transmit panel, the first transmission type associated with a lower priority than the second transmission type, and receiving, based on the lower priority of the second transmission type, the second transmission type for the second uplink transmission on the second transmit panel and dropping the first transmission type for the first uplink transmission on the first transmit panel.

In some examples of the method, apparatuses, and non-transitory computer-readable medium described herein, the multi-panel uplink transmission includes one or more of a SRS transmission, a PUCCH transmission, a PUSCH transmission, a PRACH transmission, or a combination thereof.

In some examples of the method, apparatuses, and non-transitory computer-readable medium described herein, the PUCCH transmission indicates at least one of a HARQ-ACK information, a SR, a CSI, a LRR information, of a combination thereof, and the PUSCH transmission includes at least of the CSI, the HARQ-ACK information, or a combination thereof.

DETAILED DESCRIPTION

Figure 1:
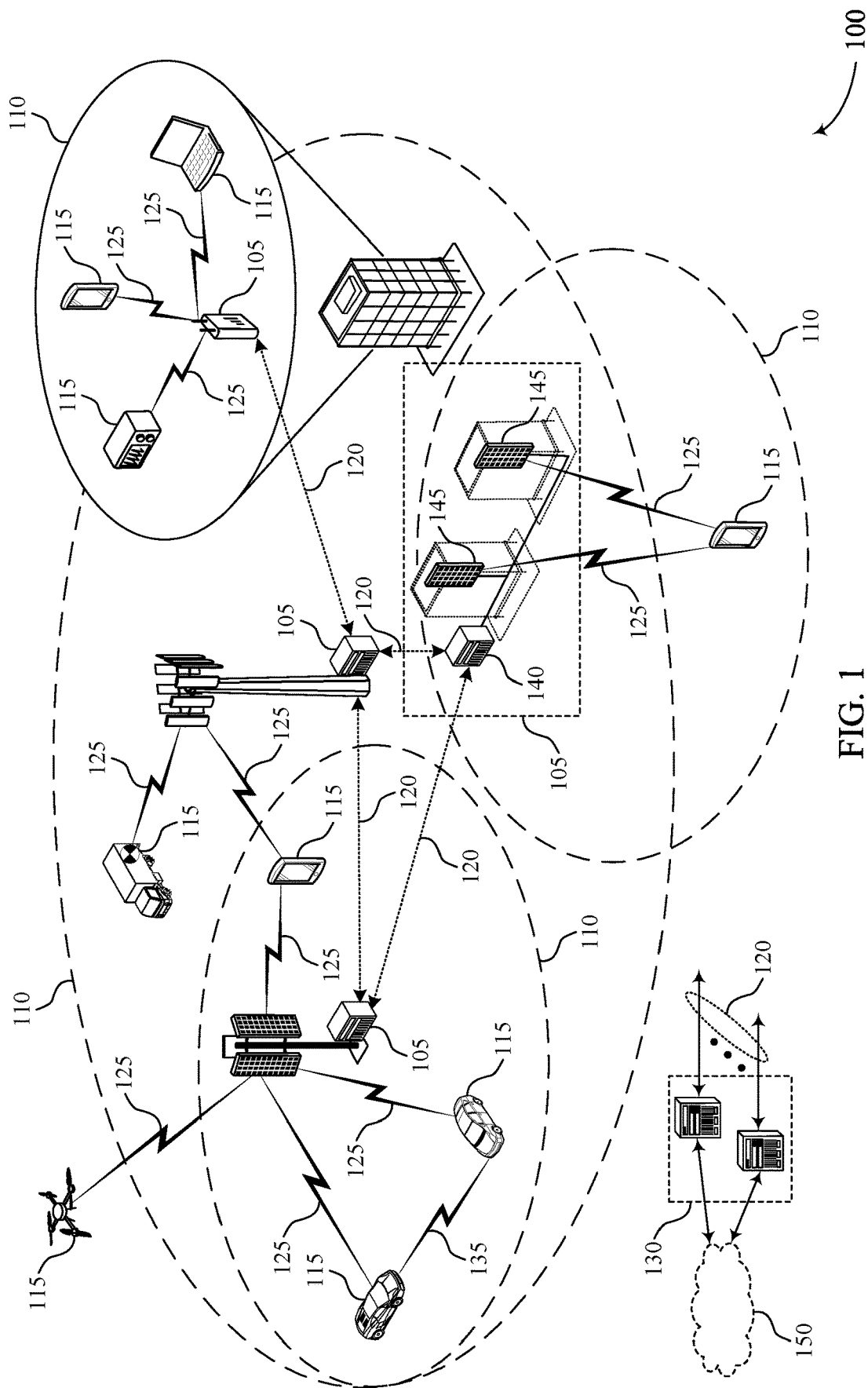
FIG. 1 illustrates an example of a system for wireless communications that supports transmit power prioritization for multi-panel uplink transmission in accordance with aspects of the present disclosure.

User equipment (UE) may support multi-panel uplink transmissions to a base station using one or more transmit panels of the UE. Generally, a transmit panel of the UE may refer to any configuration of hardware (e.g., antennas) and/or software (e.g., beamforming techniques, directional transmission techniques, weighting criteria, etc.) used to perform an uplink transmission. For example, a transmit panel may refer to a particular transmitted precoding matrix indicator (TPMI)) configured for the UE, a sounding reference signal (SRS) resource indicator (SRI) configured for the UE, a transmission configuration indicator (TCI) configured for the UE, and the like. In some examples, a transmit panel of the UE may refer to different antennas of the UE and/or to an antenna of the UE using a different configuration for transmissions. In some example, two or more transmit panels of the UE used to perform a multi-panel uplink transmission using various multiplexing techniques, such as spatial division multiplexing (SDM), frequency division multiplexing (FDM), time division multiplexing (TDM), and the like. In this example, a transmit panel of the UE may refer to a transmit panel used for an uplink transmission on a particular spatial configuration of the SDM, on a particular frequency of the FDM, at a particular time of the TDM, and the like.

Moreover, UE are typically configured with various priority orders for an uplink transmission based on the transmission type for the uplink transmission, e.g., physical random access channel (PRACH) transmissions, physical uplink control channel (PUCCH) transmissions, physical uplink shared channel (PUSCH) transmissions, and the like. In some examples, the transmission type may also refer to the type of information being communicated, such as hybrid automatic repeat/request acknowledgment (HARQ-ACK) transmissions, scheduling request (SR) transmissions, long-range radar (LRR) transmissions, and the like. The UE, for the multi-panel uplink transmission, is also configured with an available transmit power which defines a total amount of transmit power that the UE is permitted to use during the multi-panel uplink transmission and/or during a given time period. Accordingly, the UE, when performing a multi-panel uplink transmission, allocates its available transmit power based on the transmission type of the uplink transmission according to the priority order. However, these techniques do not enable or otherwise permit the UE to consider the transmit panel when allocating the available transmit power for the uplink transmission.

Aspects of the disclosure are initially described in the context of wireless communications systems. Generally, the described techniques provide for allocation available transmit power using prioritization considerations on a per-transmit panel basis for the UE. For example, the UE and its associated base station may determine that the UE is to perform a multi-panel uplink transmission using two or more transmit panels (e.g., a first transmit panel, a second transmit panel, and so forth) of the UE. The UE and associated base station may identify a priority order for performing the uplink transmissions of the multi-panel uplink transmission, wherein the transmit panels of the UE have corresponding priority levels configured for each panel. The UE and associated base station may also identify or otherwise determine the available transmit power for the multi-panel uplink transmission and perform the transmission according to the priority order and available transmit power. For example, the UE may use the first transmit panel at a first transmit power and the second transmit panel at a second transmit power that are based on the available transmit power for the multi-panel uplink transmission. Accordingly, the UE and associated base station may enable per-transmit panel priority considerations when allocating available transmit power for a multi-panel uplink transmission from the UE to the base station.

Aspects of the disclosure are further illustrated by and described with reference to apparatus diagrams, system diagrams, and flowcharts that relate to transmit power prioritization for multi-panel uplink transmission.

FIG. 1 illustrates an example of a wireless communications system 100 that supports transmit power prioritization for multi-panel uplink transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may determine that a multi-panel uplink transmission is to be performed by the UE 115, the multi-panel uplink transmission using at least a first transmit panel and a second transmit panel of the UE 115. The UE 115 may identify a priority order for performing uplink transmissions of the multi-panel uplink transmission from the UE 115, the priority order including priority levels associated with the first transmit panel and the second transmit panel. The UE 115 may identify an available transmit power for the multi-panel uplink transmission. The UE 115 may perform, according to the priority order, the multi-panel uplink transmission using at least the first transmit panel at a first transmit power and the second transmit panel at a second transmit power, the first transmit power and the second transmit power based at least in part on the available transmit power.

A base station 105 may determine that a multi-panel uplink transmission is to be performed to the base station from a UE 115, the multi-panel uplink transmission using at least a first transmit panel and a second transmit panel of the UE 115. The base station 105 may identify a priority order for the UE 115 to use for performing uplink transmissions of the multi-panel uplink transmission from the UE 115, the priority order including priority levels associated with the first transmit panel and the second transmit panel. The base station 105 may identify an available transmit power of the UE 115 for the multi-panel uplink transmission. The base station 105 may receive, according to the priority order, the multi-panel uplink transmission from the UE 115 using at least the first transmit panel at a first transmit power and the second transmit panel at a second transmit power, the first transmit power and the second transmit power based at least in part on the available transmit power.

Figure 2:
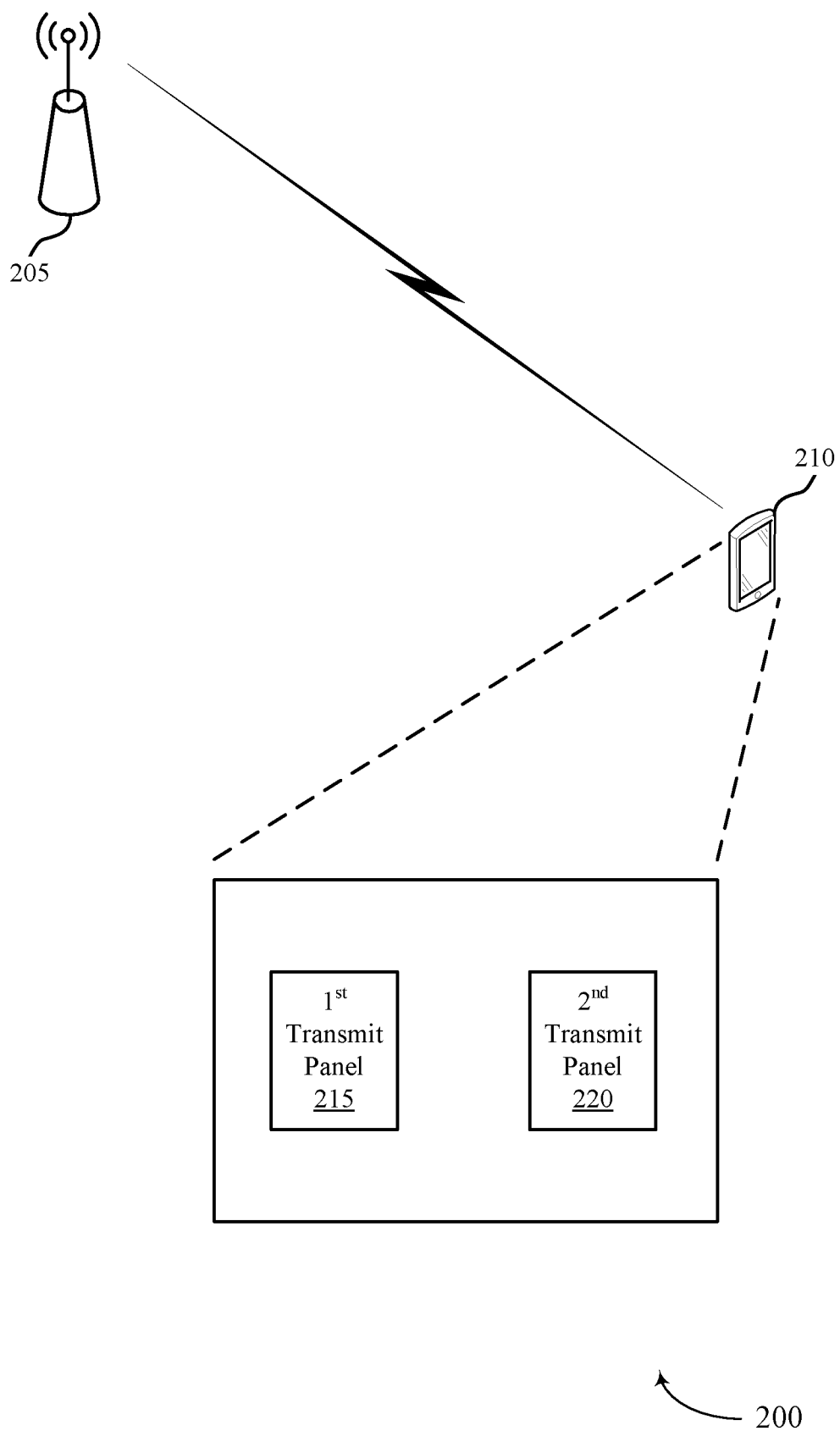
FIG. 2 illustrates an example of a wireless communication system that supports transmit power prioritization for multi-panel uplink transmission in accordance with aspects of the present disclosure.

FIG. 2 illustrates an example of a wireless communication system 200 that supports transmit power prioritization for multi-panel uplink transmission in accordance with aspects of the present disclosure. In some examples, wireless communication system 200 may implement aspects of wireless communication system 100. Wireless communication system 200 may include base station 205 and UE 210, which may be examples of corresponding devices described herein. In some aspects, UE 210 may be configured or otherwise support multi-panel uplink transmissions to base station 205 using at least a first transmit panel and a second transmit panel.

UE 210 may support multi-panel uplink transmissions to base station 205 using one or more transmit panels of UE 210, such as a first transmit panel 215 and a second transmit panel 220. Generally, a transmit panel of UE 210 may refer to any configuration of hardware (e.g., antennas) and/or software (e.g., beamforming techniques, directional transmission techniques, weighting criteria, etc.) used to perform an uplink transmission. For example, a transmit panel may refer to a particular TPMI configured for the UE, a SRI configured for the UE, a TCI configured for the UE, and the like. When UE 210 supports one or more antenna panels, each antenna panel may be distinguished from other antenna panel(s) using different kinds of information. It should be noted that the antenna panel or antenna panel identification (ID) may be used only for illustration purpose, and there are other alternatives for referring or indicating an antenna panel, such as the first transmit panel 215 and/or the second transmit panel 220.

For example, an antenna panel may be associated with a set of downlink or uplink signals and channels, and correspondingly, the antenna panel ID may be associated with the set of signal or channel IDs and indicated or derived by the signal or channel IDs. In one example, a control resource set (CORESET) may be configured with a CORESET pool index. A first antenna panel (e.g., the first transmit panel 215) may be associated with a downlink control indication (DCI) in a CORESET with a first CORESET pool index value (e.g., CORESET pool index 0) and a second antenna panel (e.g., the second transmit panel 220) may be associated with a DCI in a CORESET with a second CORESET pool index value (e.g., CORESET pool index 1).

In another example, an SRS set ID or SRS resource ID may be associated with the first antenna panel (e.g., the first transmit panel 215) and another SRS set ID or SRS resource ID may be associated with the second antenna panel (e.g., the second transmit panel 220). Further, a beam ID or beam group ID may be associated with the first antenna panel, and another beam ID or beam group ID may be associated with the second antenna panel. The beam can be a TCI state or a spatial filter setting for either downlink reception or uplink transmission and can be a spatial relation information indicated for transmitting uplink signals. The beam may be indicated by a reference signal (RS) such as a synchronization signal block (SSB), channel-state-information (CSI) RS or SRS. When a group of beam IDs are configured, the first half of the group of beam IDs may be associated with the first antenna panel, and the second half group of the group of beam IDs may be associated with the second antenna panel.

When a pair of TCI states are indicated, the first TCI state ID in the pair may be associated with the first antenna panel (e.g., the first transmit panel 215), and the second TCI state ID in the pair may be associated with the second panel (e.g., the second transmit panel 220). An uplink transmit power control configuration may include a closed loop index, and an uplink transmission with a first closed loop index value (e.g., 0) may be associated with the first antenna panel and another uplink transmission with a second closed loop index value (e.g., 1) may be associated with the second antenna panel.

An antenna port ID or antenna port group ID may be associated with the first antenna panel (e.g., the first transmit panel 215), and another antenna port ID or antenna port group ID may be associated with the second antenna panel (e.g., the second transmit panel 220), where the antenna port may include, but is not limited to, a PUSCH antenna port, SRS antenna port, and phase-tracking RS antenna port. A DMRS code division multiplexing (CDM) group ID may be associated with the first antenna panel, and another DMRS CDM group ID may be associated with the second antenna panel. When multiple DMRS CDM groups are indicated, the first DMRS CDM group may be associated with the first antenna panel, and the second DMRS CDM group may be associated with the second antenna panel.

A timing advance group (TAG) ID may be associated with the first antenna panel (e.g., the first transmit panel 215), and another TAG ID may be associated with the second antenna panel (e.g., the second transmit panel 220). A PUCCH resource ID or resource group ID may be associated with the first antenna panel, and another PUCCH resource ID or resource group ID may be associated with the second antenna panel. When a group of PUCCH resource IDs are configured, the first half group of the PUCCH resource IDs may be associated with the first antenna panel, and the second half group of PUCCH resource IDs may be associated with the second antenna panel. A radio network temporary identifier (RNTI) may be associated with the first antenna panel, and another RNTI may be associated with the second antenna panel. A physical cell identity (PCI) or synchronization signal block (SSB) set ID may be associated with the first antenna panel, and another PCI or SSB set ID may be associated with the second antenna panel. By referring to or otherwise indicating the signal or channel IDs, the corresponding antenna panel ID can be referred or indicated (e.g., implicitly signaled in the configuration signal).

In some examples, a transmit panel of UE 210 may refer to different antennas of UE 210 and/or to an antenna of UE 210 using a different configuration for transmissions. In some examples, two or more transmit panels of UE 210 (e.g., the first transmit panel 215 and second transmit panel 220) used to perform a multi-panel uplink transmission may use various multiplexing techniques, such as SDM, FDM, TDM, and the like. In this example, a transmit panel of UE 210 may refer to a transmit panel used for an uplink transmission on a particular spatial configuration of the SDM, on a particular frequency of the FDM, at a particular time period of the TDM, and the like.

UE 210 may be configured with various priority orders for uplink transmissions based on the transmission type of the uplink transmission, e.g., PRACH transmissions, PUCCH transmissions, PUSCH transmissions, and the like. In some examples, the transmission type may also refer to the type of information being communicated in the uplink transmission, such as HARQ-ACK transmissions, SR transmissions, LRR, and the like.

In one non-limiting example, priority orders for an uplink transmission based on the transmission type according to some wireless communication systems may be based on the channel and the priority index. For example, a PUCCH or a PUSCH can be indicated with a priority index 0 or a priority index 1. If a priority index is not provided for a PUSCH or a PUCCH, the priority index is 0. UE 210 may prioritize power allocations for transmissions with a higher priority index over transmissions with a lower priority index. When two uplink transmissions are of the same priority index, UE 210 may further prioritize power allocations for transmissions with a channel over transmissions with another channel, based on channel type. For single cell operation with two uplink carriers or for operation with carrier aggregation, if a total UE transmit power for PUSCH or PUCCH or PRACH or SRS transmissions on serving cells in a frequency range in a respective transmission occasion would exceed the configured maximum transmit power, UE 210 allocates power (e.g., the available transmit power) to PUSCH/PUCCH/PRACH/SRS transmissions according to the following priority order (in descending order) so that the total UE transmit power for transmissions on serving cells in the frequency range is smaller than or equal to the configured maximum transmit power for that frequency range in every symbol of the transmission occasion:

PRACH transmission on the PCell

PUCCH or PUSCH transmissions with higher priority index

For PUCCH or PUSCH transmissions with same priority index

PUCCH transmission with HARQ-ACK information, and/or SR, and/or LRR, or PUSCH transmission with HARQ-ACK information PUCCH transmission with CSI or PUSCH transmission with CSI PUSCH transmission without HARQ-ACK information or CSI and, for Type-2 random access procedure, PUSCH transmission on the PCell SRS transmission, with aperiodic SRS having higher priority than semi-persistent and/or periodic SRS, or PRACH transmission on a serving cell other than the PCell In case of uplink transmissions having the same priority order and for operations with carrier aggregation, UE 210 prioritizes power allocation for transmissions on the primary cell of the master cell group (MCG) or the secondary cell group (SCG) over transmissions on a secondary cell. In case of uplink transmissions having the same priority order and for operations with two uplink carriers, UE 210 prioritizes power allocation for transmissions on the carrier where UE 210 is configured to transmit PUCCH. If PUCCH is not configured for any of the two uplink carriers, UE 210 prioritizes power allocation for transmissions on the non-supplementary uplink carrier.

UE 210, for the multi-panel uplink transmission, is also configured with an available transmit power, which may also be referred to as a configured maximum transmit power. The configured maximum transmit power can be shared cross all the serving cells when UE 210 is in carrier aggregation or in operations with two uplink carriers. For example, the configured maximum transmit power can be defined in 3GPP technical specifications TS 38.101-1 and TS38.101-2. Accordingly, UE 210, when performing the multi-panel uplink transmission, allocates its available transmit power based on the transmission type (e.g., channel) of the uplink transmission according to the priority order. However, these techniques may not enable or otherwise permit UE 210 to consider the transmit panel when allocating the available transmit power for the uplink transmission.

Accordingly, aspects of the described techniques provide for allocation of the available transmit power using prioritization considerations on a per-transmit panel basis for UE 210. For example, UE 210 and base station 205 may determine that UE 210 is to perform a multi-panel uplink transmission using two or more transmit panels (e.g., the first transmit panel 215 and the second transmit panel 220) of UE 210. UE 210 and base station 205 may identify a priority order for performing the uplink transmissions of the multi-panel uplink transmission, wherein the transmit panels of UE 210 have corresponding priority levels configured for each panel. UE 210 and base station 205 may also identify or otherwise determine the available transmit power for the multi-panel uplink transmission and perform the transmission according to the priority order and available transmit power. For example, UE 210 may use the first transmit panel 215 at a first transmit power and the second transmit panel 220 at a second transmit power that are based on the available transmit power for the multi-panel uplink transmission and the priority order that considers the transmit panels of UE 210. Accordingly, UE 210 and base station 205 may enable per-transmit panel priority considerations when allocating available transmit power for a multi-panel uplink transmission from UE 210 to base station 205.

In some examples, this may include each UE transmit panel having an independently configured maximum available transmit power, with UE 210 applying the priority order discussed below for the multi-panel uplink transmission. The independently configured maximum transmit power for a UE transmit panel can be shared by the transmissions associated with the same transmit panel across all the carriers when UE 210 is in carrier aggregation or in operations with two uplink carriers. For example, the independently configured maximum transmit power can be defined in 3GPP technical specifications TS 38.101-1 and TS38.101-2. For example, UE 210 may receive a configuration signal indicating a first available transmit power for the first transmit panel 215 and a second available transmit power for the second transmit panel 220. The configuration signal may include RRC signaling, a medium access control (MAC) control element (CE), a downlink control information (DCI), and the like, which are transmitted from the base station 205 and/or may include signaling received at a lower layer of UE 210 (e.g., at a physical layer, layer 2, etc.) from a higher layer of UE 210 (e.g., an IP layer, an application layer, layer 3, etc.). In this situation, the available transmit power for the multi-panel uplink transmission may be based, at least in some aspects, on the first available transmit power of the first transmit panel 215 and the second available transmit power of the second transmit panel 220. For example, the first transmit power may be based on the first available transmit power and the second transmit power may be based on the second available transmit power.

In the example where each UE transmit panel has an independently configured maximum available transmit power, the priority order may be identified for the multi-panel uplink transmission when separate available transmit powers are configured on a per-transmit panel basis. For single cell operation with two uplink carriers or for operation with carrier aggregation, if a total UE transmit power for PUSCH or PUCCH or PRACH or SRS transmissions associated with a UE panel (e.g., a UE transmit panel, such as the first transmit panel 215 and/or the second transmit panel 220) on serving cells in a frequency range in a respective transmission occasion would exceed the configured maximum transmit power for that UE panel, UE 210 allocates power to PUSCH/PUCCH/PRACH/SRS transmissions associated with the UE panel according to the following priority order (in descending order) so that the total UE transmit power for transmissions associated with the UE panel on serving cells in the frequency range is smaller than or equal to the configured maximum transmit power associated with the UE panel for that frequency range in every symbol of transmission occasion. The following priority order may be applied separately for each UE transmit panel according to the corresponding independently configured maximum available transmit power for the UE transmit panel.

PRACH transmission on the PCell

PUCCH or PUSCH transmissions with higher priority index

For PUCCH or PUSCH transmissions with same priority index

PUCCH transmission with HARQ-ACK information, and/or SR, and/or LRR, or PUSCH transmission with HARQ-ACK information PUCCH transmission with CSI or PUSCH transmission with CSI PUSCH transmission without HARQ-ACK information or CSI and, for Type-2 random access procedure, PUSCH transmission on the PCell SRS transmission, with aperiodic SRS having higher priority than semi-persistent and/or periodic SRS, or PRACH transmission on a serving cell other than the PCell In some examples, this may include two UE transmit panels (e.g., the first transmit panel 215 and the second transmit panel 220) sharing a configured maximum available transmit power. The configured maximum transmit power can be shared by the transmissions associated with all the transmit panels cross all the carriers when UE 210 is in carrier aggregation or in operations with two uplink carriers. For example, the configured maximum transmit power can be defined in 3GPP technical specifications TS 38.101-1 and TS38.101-2. For example, UE 210 may receive a configuration signal that indicates a shared available transmit power, with the shared available transmit power corresponding to the available transmit power for the multi-panel uplink transmission. The configuration signal may include RRC signaling, a MAC CE, a DCI, and the like, which are transmitted from the base station 205 and/or may include signaling received at a lower layer of UE 210 from a higher layer of UE 210.

In some aspects of this example, the priority order for the multi-panel uplink transmission may correspond to transmit panel>priority index>channel. For example, UE 210 may prioritize power allocations for transmissions on one transmit panel over transmissions on another transmit panel. For example, when performing the multi-panel uplink transmission, UE 210 may transmit a first uplink transmission on the first transmit panel 215 using the first transmit power and a second uplink transmission on the second transmit panel 220 using a second transmit power. In this situation, the transmit panels of UE 210 may have different priority levels. For example, UE 210 may identify or otherwise determine that a first priority for the first transmit panel 215 is a higher priority than a second priority for the second transmit panel 220, or vice versa. Accordingly, UE 210 may transmit uplink transmissions on the first transmit panel 215 according to the first priority and uplink transmissions on the second transmit panel 220 according to the second priority, e.g., may make transmit power allocations for each transmit panel based on the corresponding priority of that transmit panel. When two uplink transmissions are associated with the same transmit panel, UE 210 may further prioritize power allocations for transmissions with a higher priority index over transmissions with a lower priority index. When two uplink transmissions are associated with the same panel and the same priority index, UE 210 may further prioritize power allocations for transmissions with a channel over transmissions on another channel.

In some aspects, the priority order consisting of transmit panel>priority index>channel may be based on an index or other identifier (ID) of the transmit panels of UE 210. For example, UE 210 may identify a first identifier (e.g., a first panel ID) for the first transmit panel 215 and a second identifier (e.g., a second panel ID) for the second transmit panel 220. In this situation, the priority order may include, for single cell operation with two uplink carriers or for operation with carrier aggregation, if a total UE transmit power for PUSCH or PUCCH or PRACH or SRS transmissions on serving cells in a frequency range in a respective transmission occasion would exceed the configured maximum transmit power, UE 210 allocates power to PUSCH/PUCCH/PRACH/SRS transmissions according to the following priority order (in descending order) so that the total UE transmit power for transmissions on serving cells in the frequency range is smaller than or equal to the configured maximum transmit power for that frequency range in every symbol of transmission occasion.

PRACH transmission on the Pcell

PUCCH, SRS or PUSCH transmission associated with no panel ID or lower panel ID

PUCCH or PUSCH transmissions with higher priority index

For PUCCH or PUSCH transmissions with same priority index

PUCCH transmission with HARQ-ACK information, and/or SR, and/or LRR, or PUSCH transmission with HARQ-ACK information PUCCH transmission with CSI or PUSCH transmission with CSI PUSCH transmission without HARQ-ACK information or CSI and, for Type-2 random access procedure, PUSCH transmission on the Pcell SRS transmission, with aperiodic SRS having higher priority than semi-persistent and/or periodic SRS, or PRACH transmission on a serving cell other than the PCell PUCCH, SRS or PUSCH transmission associated with higher panel ID Accordingly, UE 210 following this priority order may include identifying a first priority of a first transmission type (e.g., HARQ-ACK, SR, LRR, etc.) for the first uplink transmission on the first transmit panel 215, which may be a higher priority than a second priority of a second transmission type for the first uplink transmission on the first transmit panel 215.

In some aspects of this example, the priority order for the multi-panel uplink transmission may correspond to priority index>panel>channel. For example, UE 210 may transmit, during the multi-panel uplink transmission, a first uplink transmission on the first transmit panel 215 using the first transmit power and a second uplink transmission on the second transmit panel using the second transmit power. In the situation where the priority index is the same and for operations with carrier aggregation, UE 210 prioritizes power allocation for transmissions on one panel over transmissions on another panel. Accordingly, UE 210 may identify or otherwise determine that the first priority of the first uplink transmission is a higher priority than a second priority of the second uplink transmission. UE 210 may prioritize, during the multi-panel uplink transmission, based on the first priority of the first uplink transmission and the second priority of the second uplink transmission.

In some aspects, the priority order priority index>panel>channel may be based on an index or other identifier of the transmit panels (e.g., panel ID) of UE 210. For example, UE 210 may identify a first identifier for the first transmit panel that is associated with a first priority and a second identifier for the second transmit panel 220 that is associated with the second priority. In this example, the first priority is a higher priority than the second priority. Accordingly, UE 210 may identify a first transmission type for the first uplink transmission on the first transmit panel 215 and a second transmission type for the second transmission on the second transmit panel 220. In this example, the first transmission type may be associated with a lower priority than the second transmission type. UE 210 may transmit the second transmission type for the second uplink transmission on the second transmit panel 220 and drop the first transmission type for the first uplink transmission on the first transmit panel 215. Accordingly, the priority order may include, for single cell operation with two uplink carriers or for operation with carrier aggregation, if a total UE transmit power for PUSCH or PUCCH or PRACH or SRS transmissions on serving cells in a frequency range in a respective transmission occasion would exceed the configured maximum transmit power, UE 210 allocates power to PUSCH/PUCCH/PRACH/SRS transmissions according to the following priority order (in descending order) so that the total UE transmit power for transmissions on serving cells in the frequency range is smaller than or equal to the configured maximum transmit power for that frequency range in every symbol of transmission occasion.

PRACH transmission on the Pcell

PUCCH or PUSCH transmissions with higher priority index

PUCCH or PUSCH transmission of no panel ID or lower panel ID with higher priority than that of higher panel ID For PUCCH or PUSCH transmissions with same priority index and with no panel ID or lower panel ID PUCCH transmission with HARQ-ACK information, and/or SR, and/or LRR, or PUSCH transmission with HARQ-ACK information, PUCCH transmission with CSI or PUSCH transmission with CSI, PUSCH transmission without HARQ-ACK information or CSI and, for Type-2 random access procedure, PUSCH transmission on the Pcell, SRS transmission with no panel ID or lower panel ID, with aperiodic SRS having higher priority than semi-persistent and/or periodic SRS, or PRACH transmission on a serving cell other than the Pcell with no panel ID or lower panel ID For PUCCH or PUSCH transmissions with same priority index and with higher panel ID SRS transmission with higher panel ID, with aperiodic SRS having higher priority than semi-persistent and/or periodic SRS, or PRACH transmission on a serving cell other than the Pcell with higher panel ID In some aspects of this example, the priority order may correspond to priority index>channel>panel. For example, UE 210 may identify or otherwise determine a first priority of the first transmission type for the first uplink transmission that has a higher priority than a second priority for a second transmission type for the second uplink transmission. In this situation, prioritization of the transmit power on a per-transmit panel basis may be based on the first priority of the first transmission type and the second priority of the second transmission type. In the case of same priority order (e.g., the priority index and the channel type are the same for the first and second uplink transmissions) and for operation with carrier aggregation, UE 210 may prioritize power allocation for transmissions on one panel over transmissions on another panel.

In some aspects, the priority order priority index>channel>panel may be based on an index or other identifier of the transmit panels (e.g., panel ID) of UE 210. For example, UE 210 may identify a first identifier for the first transmit panel 215 that is associated with a first priority and a second identifier for the second transmit panel 220 that is associated with a second priority. The first priority may be a higher priority than the second priority, or vice versa. UE 210 may identify a first transmission type for the first uplink transmission on the first transmit panel 215 and a second transmission type for the second uplink transmission on the second transmit panel 220. In this situation, the first transmission type may be associated with a lower priority than the second transmission type. Accordingly, UE 210 may transmit the second transmission type for the second uplink transmission on the second transmit panel 220 and drop the first transmission type for the first uplink transmission on the first transmit panel 215. In the case of the same priority order and for operation with carrier aggregation and multiple panel transmission, UE 210 prioritizes power allocation for transmissions associated with a lower or no panel ID over transmissions associated with a higher panel ID. Accordingly, the priority order may include, for single cell operation with two uplink carriers or for operation with carrier aggregation, if a total UE transmit power for PUSCH or PUCCH or PRACH or SRS transmissions on serving cells in a frequency range in a respective transmission occasion would exceed the configured maximum transmit power, UE 210 allocates power to PUSCH/PUCCH/PRACH/SRS transmissions according to the following priority order (in descending order) so that the total UE transmit power for transmissions on serving cells in the frequency range is smaller than or equal to the configured maximum transmit power for that frequency range in every symbol of transmission occasion.

PRACH transmission on the Pcell

PUCCH or PUSCH transmissions with higher priority index

PUCCH or PUSCH transmission of no panel ID or lower panel ID with higher priority than that of higher panel ID For PUCCH or PUSCH transmissions with same priority index PUCCH transmission with HARQ-ACK information, and/or SR, and/or LRR, or PUSCH transmission with HARQ-ACK information, of no panel ID or lower panel ID with higher priority than that of higher panel ID PUCCH transmission with CSI or PUSCH transmission with CSI, of no panel ID or lower panel ID with higher priority than that of higher panel ID PUSCH transmission without HARQ-ACK information or CSI and, for Type-2 random access procedure, PUSCH transmission on the Pcell, of no panel ID or lower panel ID with higher priority than that of higher panel ID SRS transmission, with aperiodic SRS having higher priority than semi-persistent and/or periodic SRS, or PRACH transmission on a serving cell other than the Pcell SRS transmission of no panel ID or lower panel ID with higher priority than that of higher panel ID As discussed above, base station 205 may transmit a configuration signal to UE 210 indicating configuration information, such as the priority order used for the multi-panel uplink transmissions including the first transmit panel 215 and the second transmit panel 220. Accordingly, in some examples the configuration signal may be RRC signaling/configured. As also discussed, the configuration signal may come from a higher layer of UE 210 and be received at a lower layer of UE 210. In some aspects, the priority order for the transmit panels of UE 210 used during the multi-panel uplink transmission may include or otherwise be based on (e.g., a transmit panel of UE 210 may correspond, or otherwise refer to) a special panel ID (e.g., a lower panel ID), with a special control resource set (CORESET) pool index (e.g., a lower CORESET pool index), with a special SRS ID (e.g., a lower SRS set index), with a special close loop index (e.g., a lower CLI index), and the like.

Accordingly, UE 210 may perform the multi-panel uplink transmission to base station 205 using at least the first transmit panel 215 at a first transmit power and the second transmit panel 220 at a second transmit power. The first transmit power and the second transmit power may be based on the available transmit power and may be selected based, at least in some aspects, on the priority associated with each transmit panel. Base station 205 may receive and process the multi-panel uplink transmission according to the techniques discussed above, e.g., based on the priority order and/or available transmit power indicated to UE 210.

Figure 3A:
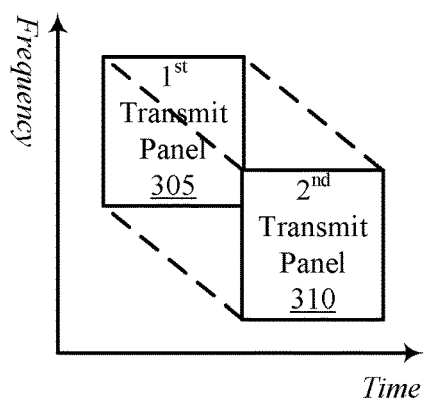
FIGS. 3A-3C illustrate examples of a transmit panel configuration that supports transmit power prioritization for multi-panel uplink transmission in accordance with aspects of the present disclosure.
Figure 3B:
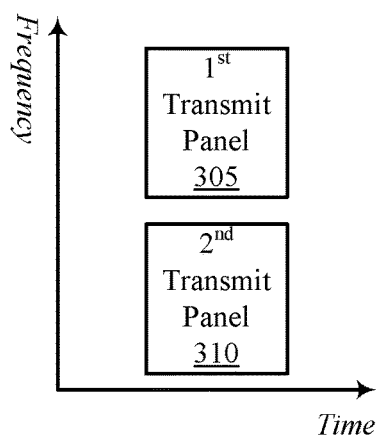
Figure 3C:
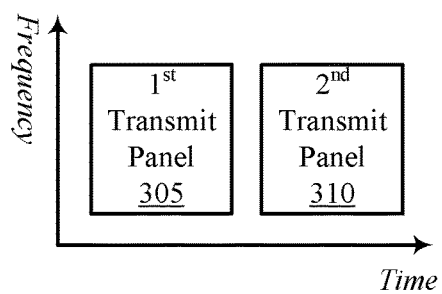

FIGS. 3A through 3C illustrate examples of a transmit panel configuration 300 that supports transmit power prioritization for multi-panel uplink transmission in accordance with aspects of the present disclosure. In some examples, transmit panel configuration 300 may be implemented by or may implement aspects of wireless communication systems 100 and/or 200. Aspects of transmit panel configuration 300 may be implemented by a UE and/or base station, which may be examples of the corresponding devices described herein. Generally, transmit panel configuration 300-*a* of FIG. 3A illustrates an example of the described techniques being applied in an SDM scenario, transmit panel configuration 300-*b* of FIG. 3B illustrates an example of the described techniques being applied in an FDM scenario, and transmit panel configuration 300-*c* of FIG. 3C illustrates an example of the described techniques being applied in a TDM scenario.

As discussed above, a UE may support multi-panel uplink transmissions to a base station using one or more transmit panels of the UE, such as a first transmit panel 305 and a second transmit panel 310. Generally, a transmit panel of the UE may refer to any configuration of hardware (e.g., antennas) and/or software (e.g., beamforming techniques, directional transmission techniques, weighting criteria, etc.) used to perform an uplink transmission. For example, a transmit panel may refer to a particular TPMI configured for the UE, a SRI configured for the UE, a TCI configured for the UE, and the like. In some examples, a transmit panel of the UE may refer to different antennas of the UE and/or to an antenna of the UE using a different configurations for transmissions. In some example, two or more transmit panels of the UE (e.g., the first transmit panel 305 and the second transmit panel 310) are used to perform a multi-panel uplink transmission using various multiplexing techniques, such as SDM, FDM, TDM, a combination of two or more of SDM, FDM, and TDM, and the like. In this example, a transmit panel of the UE may refer to a transmit panel used for an uplink transmission on a particular spatial configuration of the SDM, on a particular frequency of the FDM, at a particular time of the TDM, and the like. In some aspects, a transmit panel may refer to a special panel ID (e.g., a lower panel ID), with a special CORESET pool index (e.g., a lower CORESET pool index), with a special SRS ID (e.g., a lower SRS set index), with a special close loop index (e.g., a lower CLI index), and the like.

For example, the UE and base station may determine that the UE is to perform a multi-panel uplink transmission using two or more transmit panels (e.g., the first transmit panel 305 and the second transmit panel 310) of the UE. The UE and base station may identify a priority order for performing the uplink transmissions of the multi-panel uplink transmission, wherein the transmit panels of the UE have corresponding priority levels configured for each panel. The UE and base station may also identify or otherwise determine the available transmit power for the multi-panel uplink transmission and perform the transmission according to the priority order and available transmit power. For example, the UE may use the first transmit panel 305 at a first transmit power and the second transmit panel 310 at a second transmit power that are based on the available transmit power for the multi-panel uplink transmission and the priority order that consider the transmit panels of the UE. Accordingly, the UE and base station may enable per-transmit panel priority considerations when allocating available transmit power for a multi-panel uplink transmission from the UE to base station.

More particularly and with reference to transmit panel configuration 300-*a* of FIG. 3A, the multi-panel uplink transmission may utilize SDM techniques such that the first uplink transmission at the first transmit power using the first transmit panel 305 is transmitted using a first spatial configuration. The second uplink transmission at the second transmit power using the second transmit panel 310 may be transmitted using a second spatial configuration that is different from the first spatial configuration. For example, the first spatial configuration being different from the second spatial configuration may correspond to different beamforming configurations being used for the first uplink transmission and the second uplink transmission. This may permit the UE to transmit the first uplink transmission at the first transmit power using the first transmit panel 305 at the same time (e.g., in parallel) and using the same frequency resources for transmitting the second uplink transmission at the second transmit power using the second transmit panel 310.

With reference to transmit panel configuration 300-*b* of FIG. 3B, the multi-panel uplink transmission may utilize FDM techniques such that the first uplink transmission at the first transmit power using the first transmit panel 305 is transmitted using a first frequency. The second uplink transmission at the second transmit power using the second transmit panel 310 may be transmitted using a second frequency that is different from the first frequency. For example, the first frequency being different from the second frequency may correspond to different subcarriers, carriers, bandwidth, bandwidth part (BWP), and the like, being used for the first uplink transmission and the second uplink transmission. This may permit the UE to transmit the first uplink transmission at the first transmit power using the first transmit panel 305 at the same time (e.g., in parallel), but using different frequency resources for transmitting the second uplink transmission at the second transmit power using the second transmit panel 310.

With reference to transmit panel configuration 300-*c* of FIG. 3C, the multi-panel uplink transmission may utilize TDM techniques such that the first uplink transmission at the first transmit power using the first transmit panel 305 is transmitted at a first time period. The second uplink transmission at the second transmit power using the second transmit panel 310 may be transmitted at a second time period that is different from the first time period. For example, the first time period being different from the second time period may correspond to different symbols, mini-slots, slots, transmission opportunities, transmission occasions, and the like, being used for the first uplink transmission and the second uplink transmission. This may permit the UE to transmit the first uplink transmission at the first transmit power using the first transmit panel 305 at a different time (e.g., consecutively), but using the same frequency resources for transmitting the second uplink transmission at the second transmit power using the second transmit panel 310.

Accordingly, the UE may perform the multi-panel uplink transmission to the base station using at least the first transmit panel 305 at a first transmit power and the second transmit panel 310 at a second transmit power. The first transmit power and the second transmit power may be based on the available transmit power and may be selected based, at least in some aspects, on the priority associated with each transmit panel. The base station may receive and process the multi-panel uplink transmission according to the techniques discussed above, e.g., based on the priority order and/or available transmit power indicated to the UE. The multi-panel uplink transmission may utilize SDM, FDM, and/or TDM techniques, alone or in any combination (e.g., SDM and FDM, or FDM and TDM, or SDM and TDM, or all three of SDM, FDM, and TDM).

Figure 4:
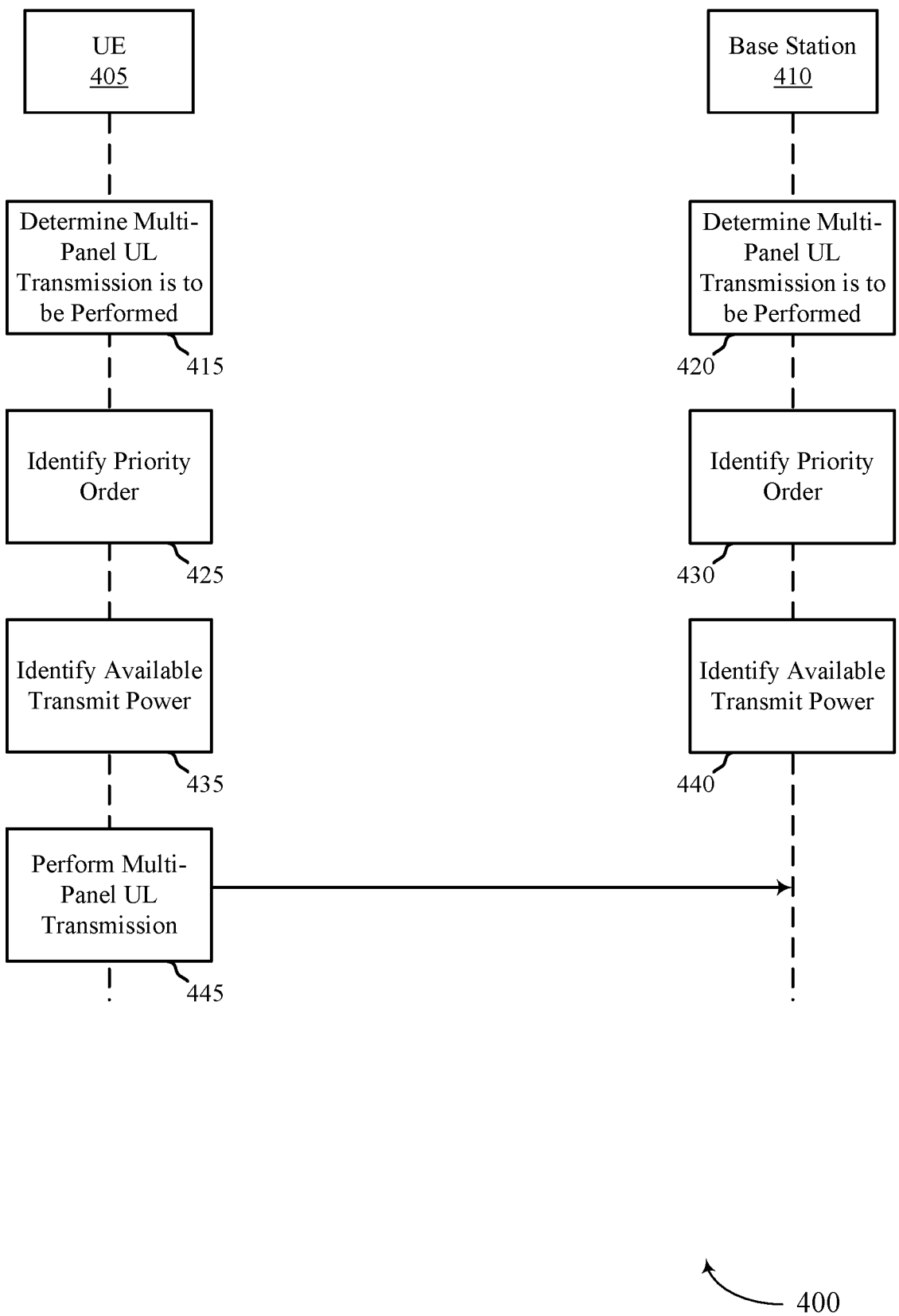
FIG. 4 illustrates an example of a process that supports transmit power prioritization for multi-panel uplink transmission in accordance with aspects of the present disclosure.

FIG. 4 illustrates an example of a process 400 that supports transmit power prioritization for multi-panel uplink transmission in accordance with aspects of the present disclosure. In some examples, process 400 may be implemented by or implement aspects of wireless communication systems 100 and/or 200, and/or transmit panel configuration 300. Aspects of process 400 may be implemented by UE 405 and/or base station 410, which may be examples of corresponding devices described herein. In some aspects, UE 405 may be configured to support a multi-panel uplink transmission to base station 410 using at least a first transmit panel and the second transmit panel of UE 405.

At 415, UE 405 may determine that a multi-panel uplink transmission is to be performed. The multi-panel uplink transmission may use at least a first transmit panel and a second transmit panel of UE 405. In some aspects, this may be based on UE 405 determining that it has uplink information to transmit to base station 410 (e.g., in a transmit buffer). Accordingly, UE 405 may transmit or otherwise convey an indication of a SR to base station 410 indicating that the multi-panel uplink transmission is to be performed. In another example, this may be based on a request and/or scheduled information to be provided to base station 410, such as HARQ-ACK information scheduled for transmission to base station 410.

At 420, base station 410 may determine that a multi-panel uplink transmission is to be performed from UE 405. The multi-panel uplink transmission may use at least a first transmit panel and a second transmit panel of UE 405. In some aspects, this may be based on an indication of uplink data to be transmitted by UE 405 and/or based on a request and/or scheduled information to be provided to base station 410 by UE 405.

At 425, UE 405 may identify a priority order for performing uplink transmissions of the multi-panel uplink transmission. The priority order may include priority levels associated with the first transmit panel and the second transmit panel. In some aspects, this may include UE 405 identifying that a first priority of the first transmit panel is a higher priority than the second priority of the second transmit panel. Prioritizing the available transmit power in this situation may be based on the first priority of the first transmit panel being a higher priority than the second priority of the second transmit panel, or vice versa.

At 430, base station 410 may identify a priority order for UE 405 to use for performing uplink transmissions of the multi-panel uplink transmission. The priority order may include priority levels associated with the first transmit panel and the second transmit panel of UE 405. In some aspects, this may include base station 410 identifying a first priority of the first transmit panel that has a higher priority than the second priority of the second transmit panel. Prioritization of the transmit power for the multi-panel uplink transmission by UE 405 may be based on the first priority of the first transmit panel and the second priority of the second transmit panel.

In some aspects, this may include base station 410 identifying a first identifier for the first transmit panel that is associated with a first priority and a second identifier for the second transmit panel that is associated with the second priority. The second priority in this example may be a lower priority than the first priority. Base station 410 may identify a first transmission type for the first uplink transmission on the first transmit panel and a second transmission type for the second uplink transmission on the second transmit panel. The first transmission type may be associated with a lower priority than the second transmission type. In this instance, base station 410 may receive the second transmission type for the second uplink transmission on the second transmit panel, with UE 405 dropping the first transmission type for the first uplink transmission on the first transmit panel.

At 435, UE 405 may identify an available transmit power for the multi-panel uplink transmission. In some aspects, this may include base station 410 transmitting (and UE 405 receiving) a configuration signal indicating a first available transmit power for the first transmit panel and a second available transmit power for the second transmit panel. The available transmit power for the multi-panel uplink transmission may be based on the first available transmit power and the second available transmit power.

In some aspects, this may include UE 405 determining that the first transmit power exceeds the first available transmit power for the first transmit panel. Accordingly, UE 405 may identify that a first priority of a first transmission type for the first uplink transmission on the first transmit panel is a higher priority than the second priority of the second transmission type for a second uplink transmission on the first transmit panel. UE 405 may transmit the first transmission type of the first uplink transmission on the first transmit panel and drop the second uplink transmission on the first transmit panel. In some aspects, the configuration signal may be received from base station 410. In other aspects, the configuration signal may be received from a higher layer of UE 405 at a lower layer of UE 405.

In some aspects, this may include UE 405 receiving a configuration signal indicating a shared available transmit power, with the available transmit power for the multi-panel uplink transmission corresponding to the shared available transmit power.

At 440, base station 410 may identify an available transmit power of UE 405 to use for the multi-panel uplink transmission. In some aspects, this may include base station 410 transmitting (and UE 405 receiving) a configuration signal indicating a first available transmit power for the first transmit panel and a second available transmit power for the second transmit panel. The first transmit power may be based on the first available transmit power and the second transmit power may be based on the second available transmit power.

In some aspects, this may include base station 410 transmitting (and UE 405 receiving) a configuration signal indicating a shared available transmit power for the multi-panel uplink transmission. The first transmit power and second transmit power may be based on the shared available transmit power, which may correspond to the available transmit power for the multi-panel uplink transmission.

At 445, UE 405 may transmit (and base station 410 may receive), according to the priority order, the multi-panel uplink transmission using at least the first transmit panel at a first transmit power and the second transmit panel at a second transmit power. The first transmit power and second transmit power may be based, at least in some aspects, on the available transmit power and the priority associated with each transmit panel.

Figure 5:
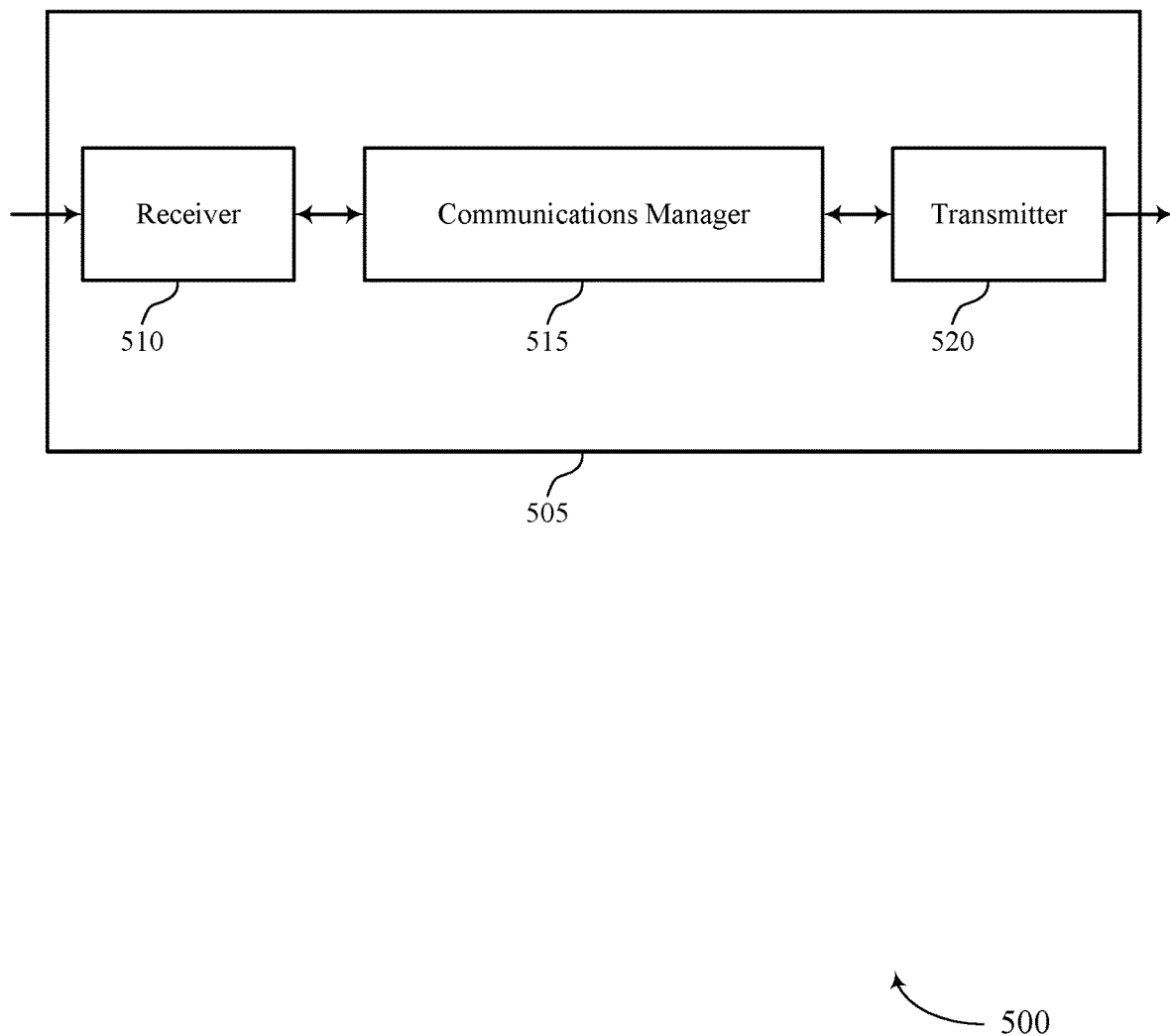
FIGS. 5 and 6 show block diagrams of devices that support transmit power prioritization for multi-panel uplink transmission in accordance with aspects of the present disclosure.

FIG. 5 shows a block diagram 500 of a device 505 that supports transmit power prioritization for multi-panel uplink transmission in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to transmit power prioritization for multi-panel uplink transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine that a multi-panel uplink transmission is to be performed by the UE, the multi-panel uplink transmission using at least a first transmit panel and a second transmit panel of the UE, perform, according to the priority order, the multi-panel uplink transmission using at least the first transmit panel at a first transmit power and the second transmit panel at a second transmit power, the first transmit power and the second transmit power based on the available transmit power, identify a priority order for performing uplink transmissions of the multi-panel uplink transmission from the UE, the priority order including priority levels associated with the first transmit panel and the second transmit panel, and identify an available transmit power for the multi-panel uplink transmission. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
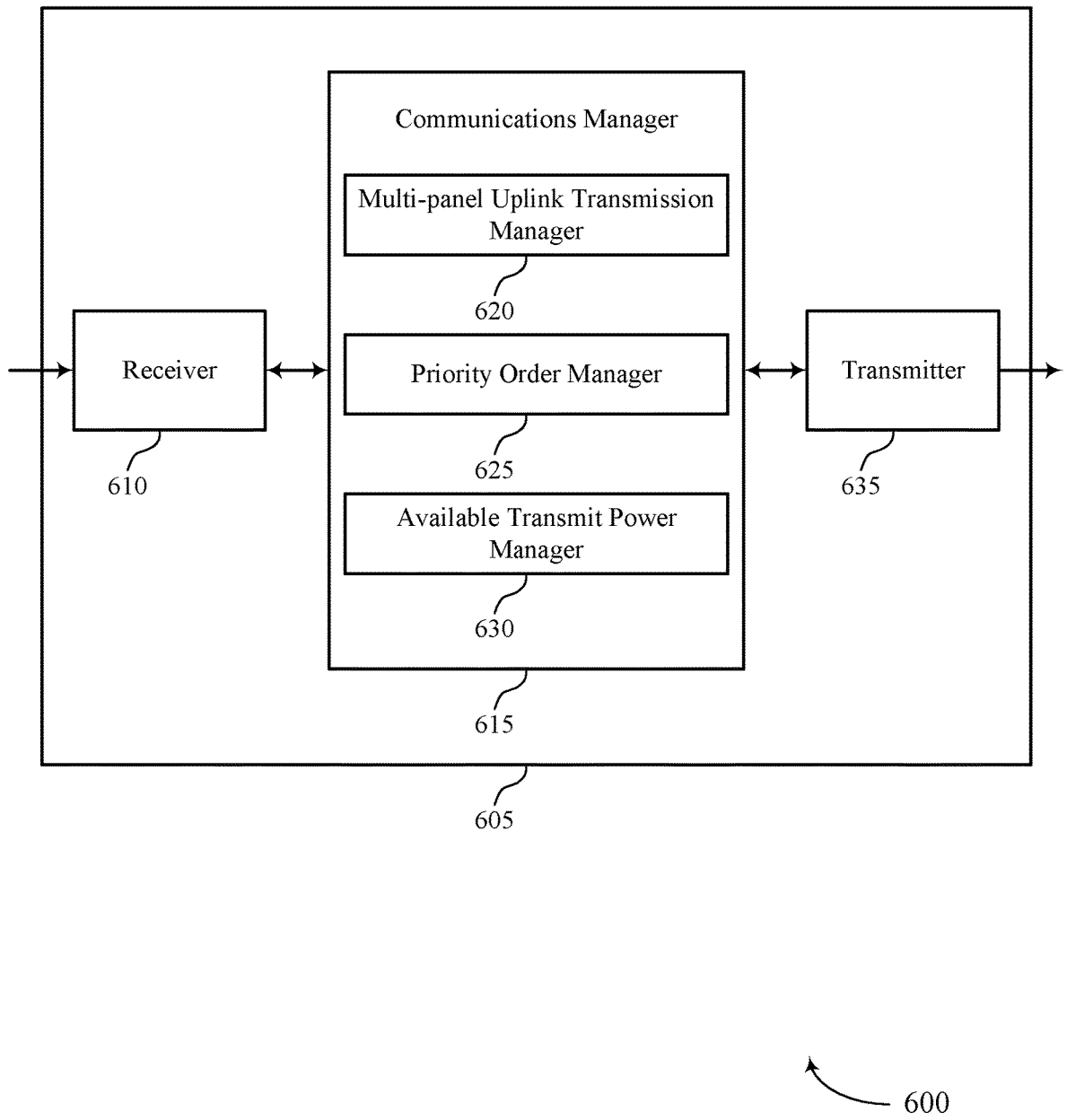

FIG. 6 shows a block diagram 600 of a device 605 that supports transmit power prioritization for multi-panel uplink transmission in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to transmit power prioritization for multi-panel uplink transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a multi-panel uplink transmission manager 620, a priority order manager 625, and an available transmit power manager 630. The communications manager 615 may be an example of aspects of the communications manager 810 described herein.

The multi-panel uplink transmission manager 620 may determine that a multi-panel uplink transmission is to be performed by the UE, the multi-panel uplink transmission using at least a first transmit panel and a second transmit panel of the UE and perform, according to the priority order, the multi-panel uplink transmission using at least the first transmit panel at a first transmit power and the second transmit panel at a second transmit power, the first transmit power and the second transmit power based on the available transmit power.

The priority order manager 625 may identify a priority order for performing uplink transmissions of the multi-panel uplink transmission from the UE, the priority order including priority levels associated with the first transmit panel and the second transmit panel.

The available transmit power manager 630 may identify an available transmit power for the multi-panel uplink transmission.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
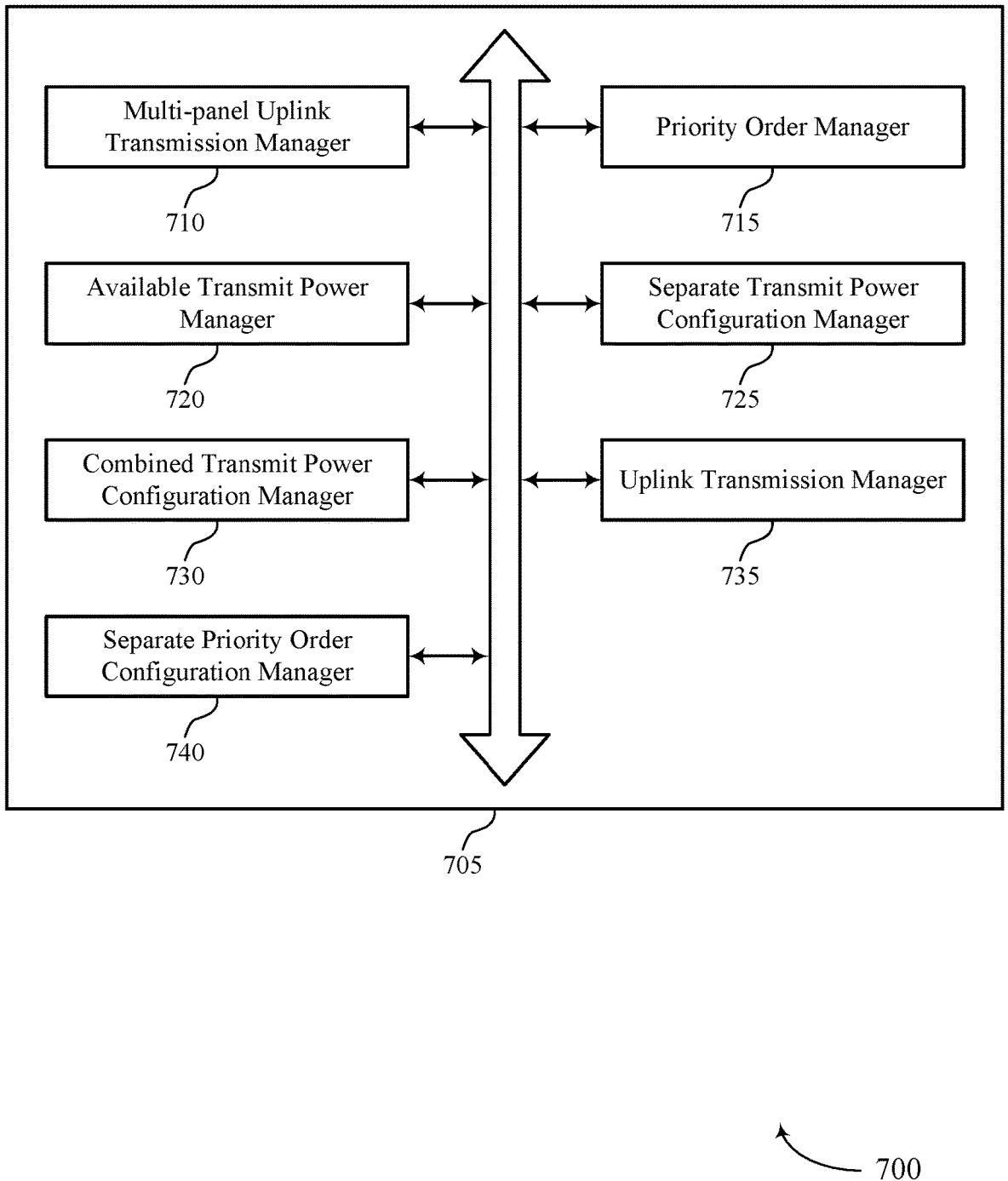
FIG. 7 shows a block diagram of a communications manager that supports transmit power prioritization for multi-panel uplink transmission in accordance with aspects of the present disclosure.

FIG. 7 shows a block diagram 700 of a communications manager 705 that supports transmit power prioritization for multi-panel uplink transmission in accordance with aspects of the present disclosure. The communications manager 705 may be an example of aspects of a communications manager 515, a communications manager 615, or a communications manager 810 described herein. The communications manager 705 may include a multi-panel uplink transmission manager 710, a priority order manager 715, an available transmit power manager 720, a separate transmit power configuration manager 725, a combined transmit power configuration manager 730, an uplink transmission manager 735, and a separate priority order configuration manager 740. Each of these modules may communicate, directly or indirectly, with one another (e.g., via one or more buses).

The multi-panel uplink transmission manager 710 may determine that a multi-panel uplink transmission is to be performed by the UE, the multi-panel uplink transmission using at least a first transmit panel and a second transmit panel of the UE. In some examples, the multi-panel uplink transmission manager 710 may perform, according to the priority order, the multi-panel uplink transmission using at least the first transmit panel at a first transmit power and the second transmit panel at a second transmit power, the first transmit power and the second transmit power based on the available transmit power. In some examples, the multi-panel uplink transmission manager 710 may transmit a first uplink transmission of the multi-panel uplink transmission using the first transmit panel of the UE and a second uplink transmission of the multi-panel uplink transmission using the second transmit panel of the UE.

In some examples, the multi-panel uplink transmission manager 710 may receive a first uplink transmission of the multi-panel uplink transmission using the first transmit panel of the UE and a second uplink transmission of the multi-panel uplink transmission using the second transmit panel of the UE. In some cases, the multi-panel uplink transmission includes one or more of a SRS transmission, a PUCCH transmission, a PUSCH transmission, a PRACH transmission, or a combination thereof.

In some cases, the PUCCH transmission indicates at least one of a HARQ-ACK information, a SR, a CSI, a LRR information, of a combination thereof, and the PUSCH transmission includes at least of the CSI, the HARQ-ACK information, or a combination thereof.

The priority order manager 715 may identify a priority order for performing uplink transmissions of the multi-panel uplink transmission from the UE, the priority order including priority levels associated with the first transmit panel and the second transmit panel.

The available transmit power manager 720 may identify an available transmit power for the multi-panel uplink transmission.

The separate transmit power configuration manager 725 may receive a configuration signal indicating a first available transmit power for the first transmit panel and a second available transmit power for the second transmit panel, the first transmit power based on the first available transmit power and the second transmit power based on the second available transmit power, and the available transmit power including the first available transmit power and the second available transmit power. In some examples, the separate transmit power configuration manager 725 may determine that the first transmit power exceeds the first available transmit power for the first transmit panel.

In some examples, the separate transmit power configuration manager 725 may identify that a first priority of a first transmission type for the first uplink transmission on the first transmit panel is a higher priority than a second priority of a second transmission type for a second uplink transmission on the first transmit panel. In some examples, the separate transmit power configuration manager 725 may transmit the first transmission type of the first uplink transmission on the first transmit panel and dropping the second uplink transmission on the first transmit panel. In some cases, the configuration signal is received in a transmission from a base station to the UE or a signal transmitted from an upper layer of the UE to a lower layer of the UE.

The combined transmit power configuration manager 730 may receive a configuration signal indicating a shared available transmit power for the multi-panel uplink transmission, the first transmit power and the second transmit power based at least part on the shared available transmit power, the available transmit power including the shared available transmit power. In some examples, the combined transmit power configuration manager 730 may transmit, based on the shared available transmit power, a first uplink transmission of the multi-panel uplink transmission on the first transmit panel using the first transmit power and a second uplink transmission of the multi-panel uplink transmission on the second transmit panel using the second transmit power.

In some examples, the combined transmit power configuration manager 730 may identify, based on the priority order, that a first priority of the first transmit panel is a higher priority than a second priority of the second transmit panel, where the prioritizing is based on the first priority of the first transmit panel being a higher priority than the second priority of the second transmit panel. In some examples, the combined transmit power configuration manager 730 may identify a first identifier for the first transmit panel and a second identifier for the second transmit panel, where the prioritizing of the first uplink transmission on the first transmit panel is based on the first identifier for the first transmit panel being associated with a higher priority than the second identifier for the second transmit panel.

In some examples, the combined transmit power configuration manager 730 may identify, based on the priority order, a first priority of a first transmission type for the first uplink transmission on the first transmit panel that is a higher priority than a second priority of a second transmission type for a first uplink transmission on the first transmit panel, the prioritizing based on the first priority of the first transmission type being a higher priority than the second priority of the second transmission type. In some cases, the configuration signal is received in a transmission from a base station to the UE or a signal transmitted from an upper layer of the UE to a lower layer of the UE.

The uplink transmission manager 735 may transmit, based on the priority order, a first uplink transmission of the multi-panel uplink transmission on the first transmit panel using the first transmit power and a second uplink transmission of the multi-panel uplink transmission on the second transmit panel using the second transmit power. In some examples, the uplink transmission manager 735 may identify, based on the priority order, a first priority of the first uplink transmission that is a higher priority than a second priority of the second uplink transmission, the prioritizing based on the first priority of the first uplink transmission and the second priority of the second uplink transmission.

In some examples, the uplink transmission manager 735 may identify a first identifier for the first transmit panel that is associated with a first priority and a second identifier for the second transmit panel that is associated with a second priority, the first priority being a higher priority than the second priority. In some examples, the uplink transmission manager 735 may identify a first transmission type for the first uplink transmission on the first transmit panel and a second transmission type for the second uplink transmission on the second transmit panel, the first transmission type associated with a lower priority than the second transmission type.

In some examples, the uplink transmission manager 735 may transmit, based on the lower priority of the second transmission type, the second transmission type for the second uplink transmission on the second transmit panel and dropping the first transmission type for the first uplink transmission on the first transmit panel.

The separate priority order configuration manager 740 may identify, based on the priority order, a first priority of a first transmission type for the first uplink transmission that is a higher priority than a second priority of a second transmission type for the second uplink transmission, the prioritizing based on the first priority of the first transmission type and the second priority of the second transmission type. In some examples, the separate priority order configuration manager 740 may identify a first identifier for the first transmit panel that is associated with a first priority and a second identifier for the second transmit panel that is associated with a second priority, the first priority being a higher priority than the second priority.

In some examples, the separate priority order configuration manager 740 may identify a first transmission type for the first uplink transmission on the first transmit panel and a second transmission type for the second uplink transmission on the second transmit panel, the first transmission type associated with a lower priority than the second transmission type. In some examples, the separate priority order configuration manager 740 may transmit, based on the lower priority of the second transmission type, the second transmission type for the second uplink transmission on the second transmit panel and dropping the first transmission type for the first uplink transmission on the first transmit panel.

Figure 8:
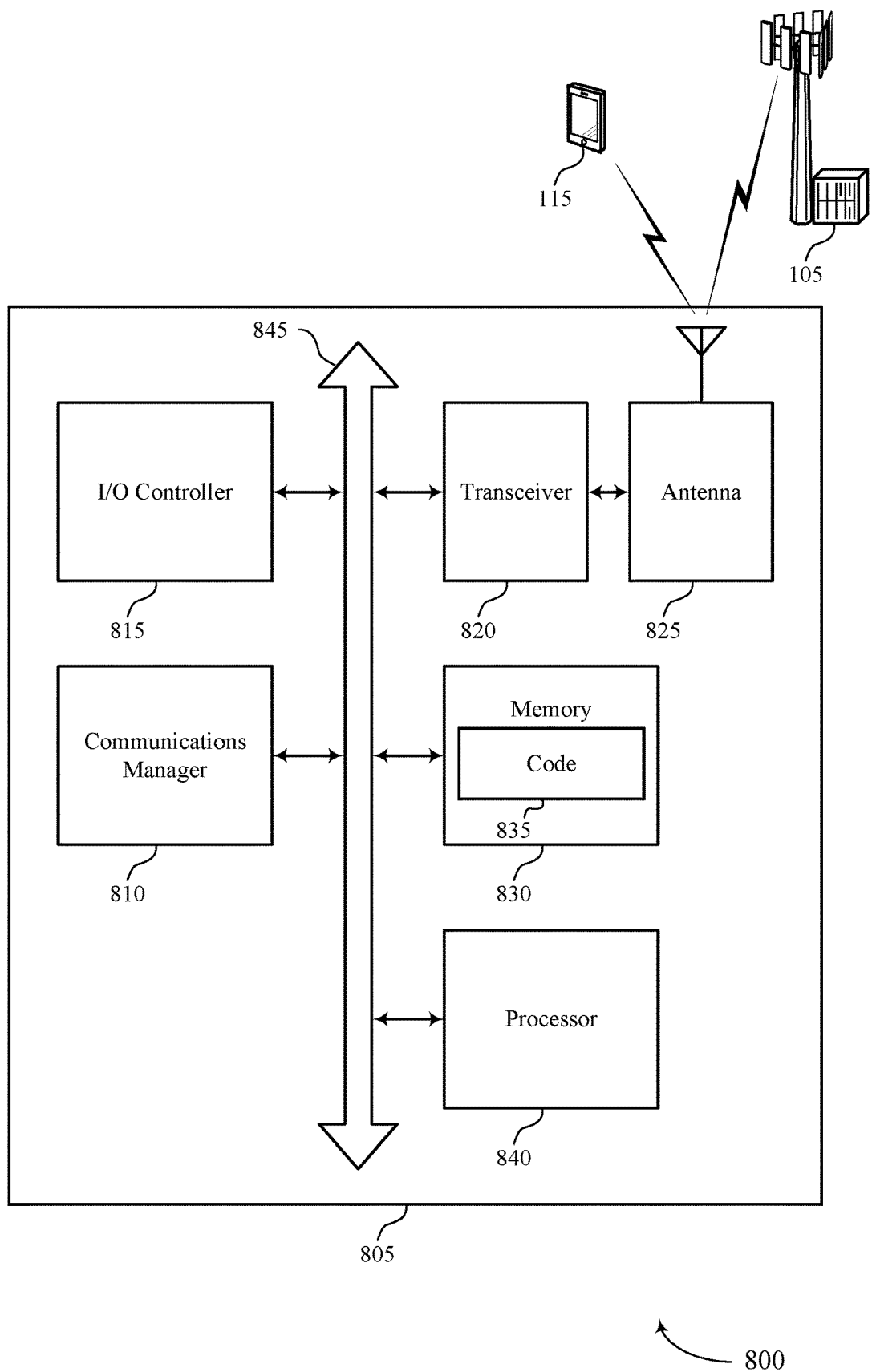
FIG. 8 shows a diagram of a system including a device that supports transmit power prioritization for multi-panel uplink transmission in accordance with aspects of the present disclosure.

FIG. 8 shows a diagram of a system 800 including a device 805 that supports transmit power prioritization for multi-panel uplink transmission in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine that a multi-panel uplink transmission is to be performed by the UE, the multi-panel uplink transmission using at least a first transmit panel and a second transmit panel of the UE, perform, according to the priority order, the multi-panel uplink transmission using at least the first transmit panel at a first transmit power and the second transmit panel at a second transmit power, the first transmit power and the second transmit power based on the available transmit power, identify a priority order for performing uplink transmissions of the multi-panel uplink transmission from the UE, the priority order including priority levels associated with the first transmit panel and the second transmit panel, and identify an available transmit power for the multi-panel uplink transmission.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting transmit power prioritization for multi-panel uplink transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
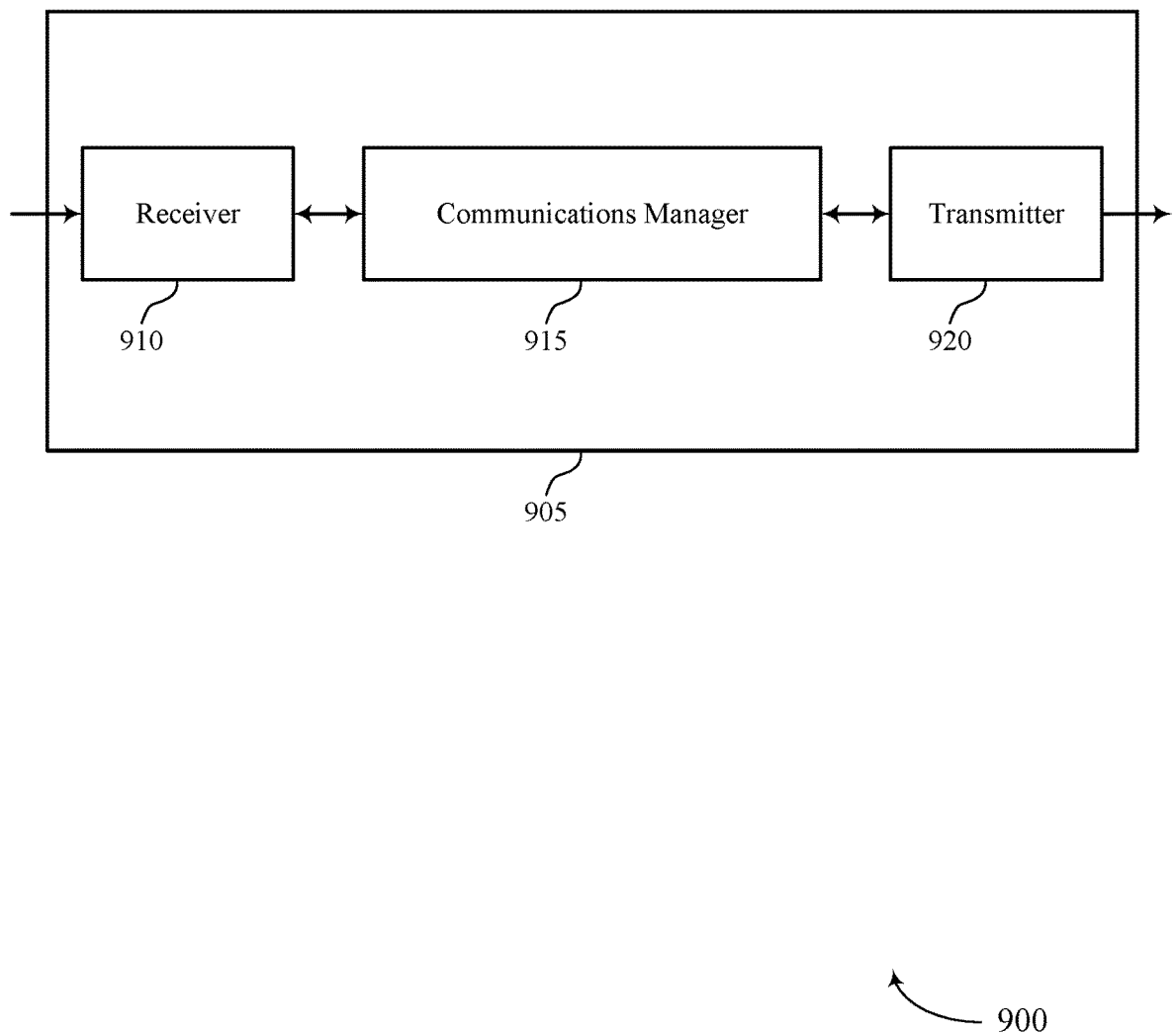
FIGS. 9 and 10 show block diagrams of devices that support transmit power prioritization for multi-panel uplink transmission in accordance with aspects of the present disclosure.

FIG. 9 shows a block diagram 900 of a device 905 that supports transmit power prioritization for multi-panel uplink transmission in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to transmit power prioritization for multi-panel uplink transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine that a multi-panel uplink transmission is to be performed to the base station from a UE, the multi-panel uplink transmission using at least a first transmit panel and a second transmit panel of the UE, receive, according to the priority order, the multi-panel uplink transmission from the UE using at least the first transmit panel at a first transmit power and the second transmit panel at a second transmit power, the first transmit power and the second transmit power based on the available transmit power, identify a priority order for the UE to use for performing uplink transmissions of the multi-panel uplink transmission from the UE, the priority order including priority levels associated with the first transmit panel and the second transmit panel, and identify an available transmit power of the UE for the multi-panel uplink transmission. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
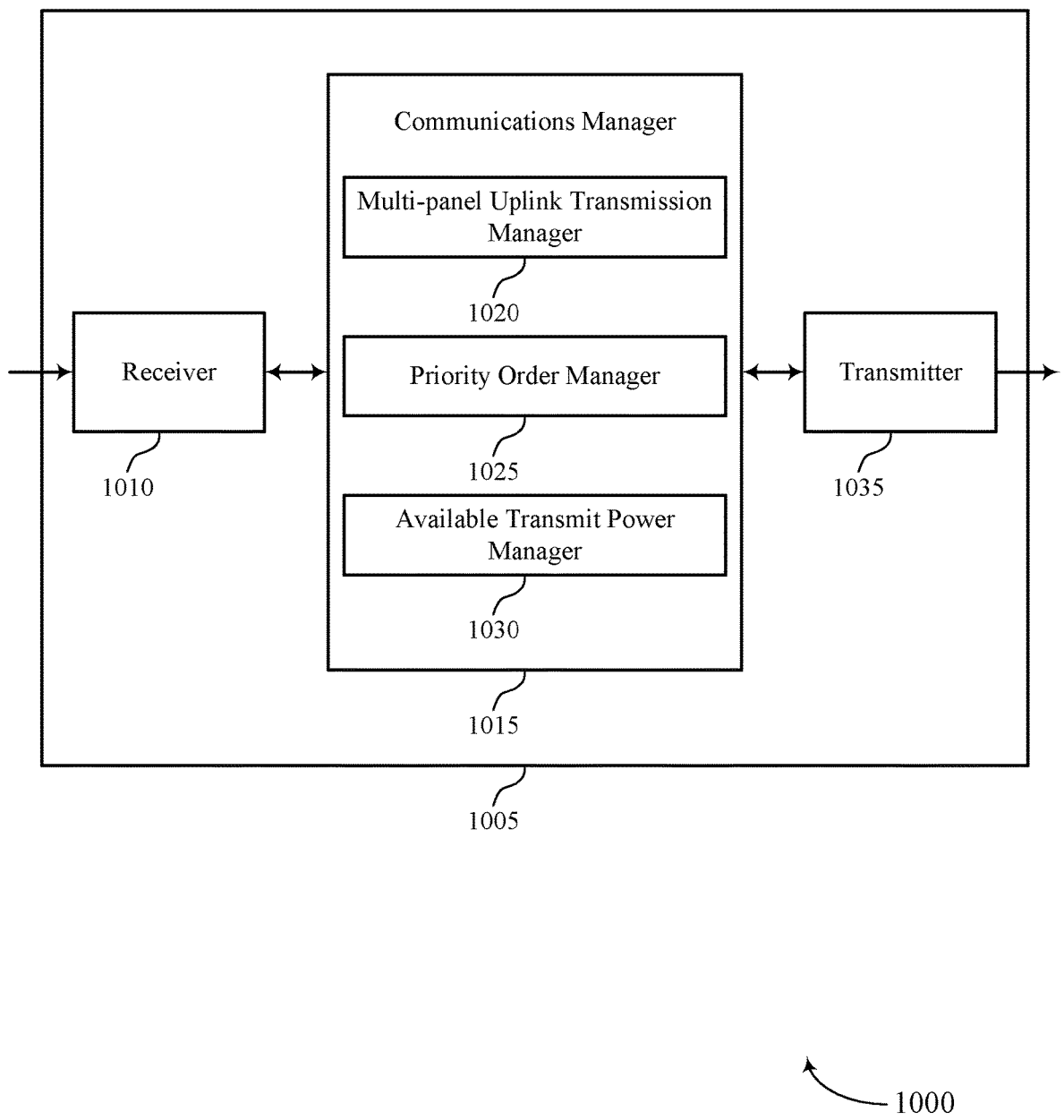

FIG. 10 shows a block diagram 1000 of a device 1005 that supports transmit power prioritization for multi-panel uplink transmission in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to transmit power prioritization for multi-panel uplink transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a multi-panel uplink transmission manager 1020, a priority order manager 1025, and an available transmit power manager 1030. The communications manager 1015 may be an example of aspects of the communications manager 1210 described herein.

The multi-panel uplink transmission manager 1020 may determine that a multi-panel uplink transmission is to be performed to the base station from a UE, the multi-panel uplink transmission using at least a first transmit panel and a second transmit panel of the UE and receive, according to the priority order, the multi-panel uplink transmission from the UE using at least the first transmit panel at a first transmit power and the second transmit panel at a second transmit power, the first transmit power and the second transmit power based on the available transmit power.

The priority order manager 1025 may identify a priority order for the UE to use for performing uplink transmissions of the multi-panel uplink transmission from the UE, the priority order including priority levels associated with the first transmit panel and the second transmit panel.

The available transmit power manager 1030 may identify an available transmit power of the UE for the multi-panel uplink transmission.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
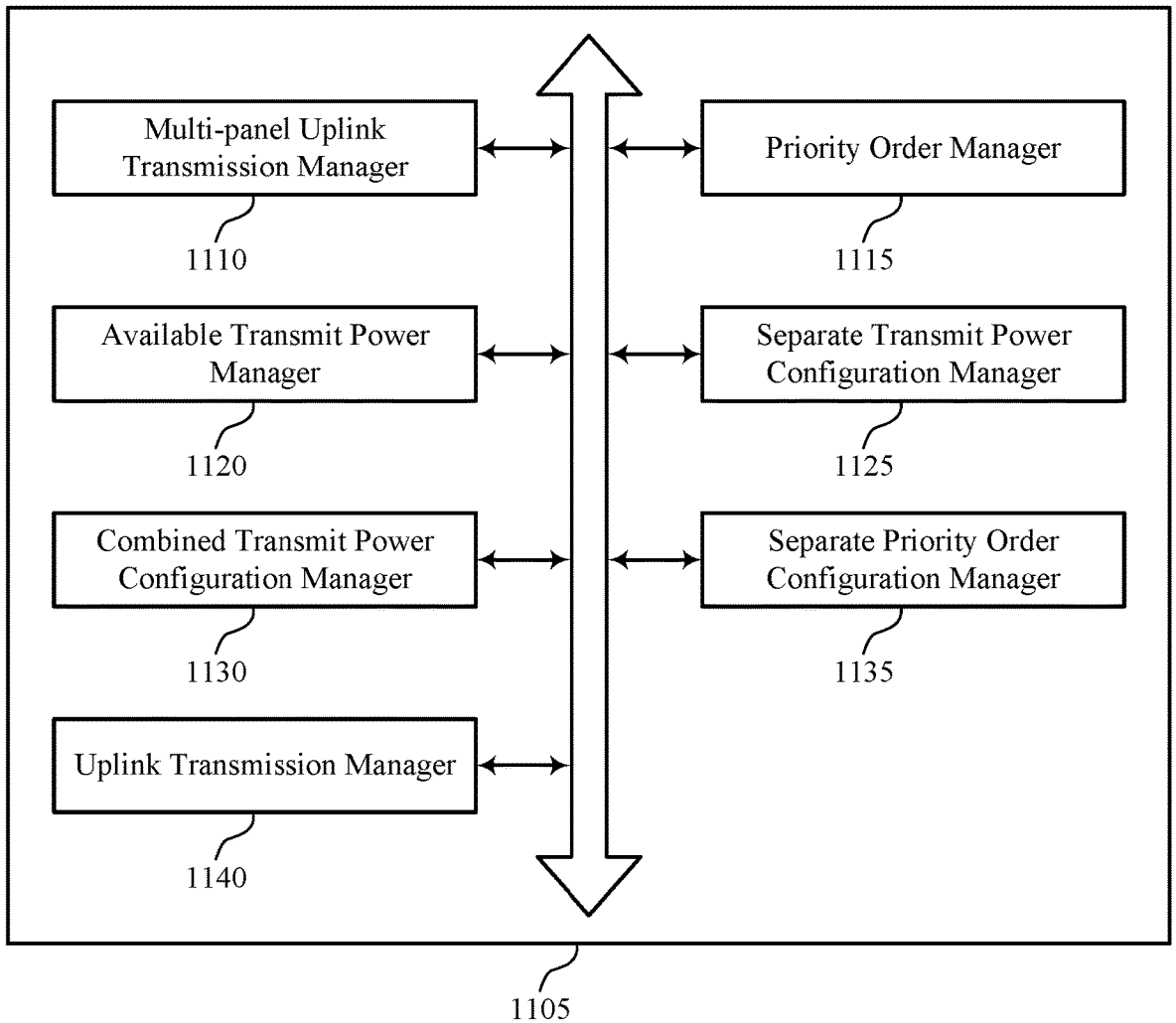
FIG. 11 shows a block diagram of a communications manager that supports transmit power prioritization for multi-panel uplink transmission in accordance with aspects of the present disclosure.

FIG. 11 shows a block diagram 1100 of a communications manager 1105 that supports transmit power prioritization for multi-panel uplink transmission in accordance with aspects of the present disclosure. The communications manager 1105 may be an example of aspects of a communications manager 915, a communications manager 1015, or a communications manager 1210 described herein. The communications manager 1105 may include a multi-panel uplink transmission manager 1110, a priority order manager 1115, an available transmit power manager 1120, a separate transmit power configuration manager 1125, a combined transmit power configuration manager 1130, a separate priority order configuration manager 1135, and an uplink transmission manager 1140. Each of these modules may communicate, directly or indirectly, with one another (e.g., via one or more buses).

The multi-panel uplink transmission manager 1110 may determine that a multi-panel uplink transmission is to be performed to the base station from a UE, the multi-panel uplink transmission using at least a first transmit panel and a second transmit panel of the UE. In some examples, the multi-panel uplink transmission manager 1110 may receive, according to the priority order, the multi-panel uplink transmission from the UE using at least the first transmit panel at a first transmit power and the second transmit panel at a second transmit power, the first transmit power and the second transmit power based on the available transmit power.

In some cases, the multi-panel uplink transmission includes one or more of a SRS transmission, a PUCCH transmission, a PUSCH transmission, a PRACH transmission, or a combination thereof. In some cases, the PUCCH transmission indicates at least one of a HARQ-ACK information, a SR, a CSI, a LRR information, of a combination thereof, and the PUSCH transmission includes at least of the CSI, the HARQ-ACK information, or a combination thereof.

The priority order manager 1115 may identify a priority order for the UE to use for performing uplink transmissions of the multi-panel uplink transmission from the UE, the priority order including priority levels associated with the first transmit panel and the second transmit panel.

The available transmit power manager 1120 may identify an available transmit power of the UE for the multi-panel uplink transmission.

The separate transmit power configuration manager 1125 may transmit a configuration signal indicating a first available transmit power for the first transmit panel and a second available transmit power for the second transmit panel, the first transmit power based on the first available transmit power and the second transmit power based on the second available transmit power, and the available transmit power including the first available transmit power and the second available transmit power. In some examples, the separate transmit power configuration manager 1125 may determine that the first transmit power exceeds the first available transmit power for the first transmit panel.

In some examples, the separate transmit power configuration manager 1125 may identify that a first priority of a first transmission type for the first uplink transmission on the first transmit panel is a higher priority than a second priority of a second transmission type for a second uplink transmission on the first transmit panel. In some examples, the separate transmit power configuration manager 1125 may receive the first transmission type of the first uplink transmission on the first transmit panel, where the UE drops the second uplink transmission on the first transmit panel.

The combined transmit power configuration manager 1130 may transmit a configuration signal indicating a shared available transmit power for the multi-panel uplink transmission, the first transmit power and the second transmit power based at least part on the shared available transmit power, the available transmit power including the shared available transmit power. In some examples, the combined transmit power configuration manager 1130 may transmit, based on the shared available transmit power, a first uplink transmission of the multi-panel uplink transmission on the first transmit panel using the first transmit power and a second uplink transmission of the multi-panel uplink transmission on the second transmit panel using the second transmit power.

In some examples, the combined transmit power configuration manager 1130 may identify, based on the priority order, that a first priority of the first transmit panel is a higher priority than a second priority of the second transmit panel, where the prioritizing is based on the first priority of the first transmit panel being a higher priority than the second priority of the second transmit panel. In some examples, the combined transmit power configuration manager 1130 may identify a first identifier for the first transmit panel and a second identifier for the second transmit panel, where the prioritizing of the first uplink transmission on the first transmit panel is based on the first identifier for the first transmit panel being associated with a higher priority than the second identifier for the second transmit panel.

In some examples, the combined transmit power configuration manager 1130 may identify, based on the priority order, a first priority of a first transmission type for the first uplink transmission on the first transmit panel that is a higher priority than a second priority of a second transmission type for a first uplink transmission on the first transmit panel, the prioritizing based on the first priority of the first transmission type being a higher priority than the second priority of the second transmission type.

The separate priority order configuration manager 1135 may receive, based on the priority order, a first uplink transmission of the multi-panel uplink transmission on the first transmit panel using the first transmit power and a second uplink transmission of the multi-panel uplink transmission on the second transmit panel using the second transmit power. In some examples, the separate priority order configuration manager 1135 may identify, based on the priority order, a first priority of the first uplink transmission that is a higher priority than a second priority of the second uplink transmission, the prioritizing based on the first priority of the first uplink transmission and the second priority of the second uplink transmission. In some examples, the separate priority order configuration manager 1135 may identify a first identifier for the first transmit panel that is associated with a first priority and a second identifier for the second transmit panel that is associated with a second priority, the first priority being a higher priority than the second priority.

In some examples, the separate priority order configuration manager 1135 may identify a first transmission type for the first uplink transmission on the first transmit panel and a second transmission type for the second uplink transmission on the second transmit panel, the first transmission type associated with a lower priority than the second transmission type. In some examples, the separate priority order configuration manager 1135 may receive, based on the lower priority of the second transmission type, the second transmission type for the second uplink transmission on the second transmit panel, where the UE drops the first transmission type for the first uplink transmission on the first transmit panel.

The uplink transmission manager 1140 may identify, based on the priority order, a first priority of a first transmission type for the first uplink transmission that is a higher priority than a second priority of a second transmission type for the second uplink transmission, the prioritizing based on the first priority of the first transmission type and the second priority of the second transmission type. In some examples, the uplink transmission manager 1140 may identify a first identifier for the first transmit panel that is associated with a first priority and a second identifier for the second transmit panel that is associated with a second priority, the first priority being a higher priority than the second priority.

In some examples, the uplink transmission manager 1140 may identify a first transmission type for the first uplink transmission on the first transmit panel and a second transmission type for the second uplink transmission on the second transmit panel, the first transmission type associated with a lower priority than the second transmission type. In some examples, the uplink transmission manager 1140 may receive, based on the lower priority of the second transmission type, the second transmission type for the second uplink transmission on the second transmit panel and dropping the first transmission type for the first uplink transmission on the first transmit panel.

Figure 12:
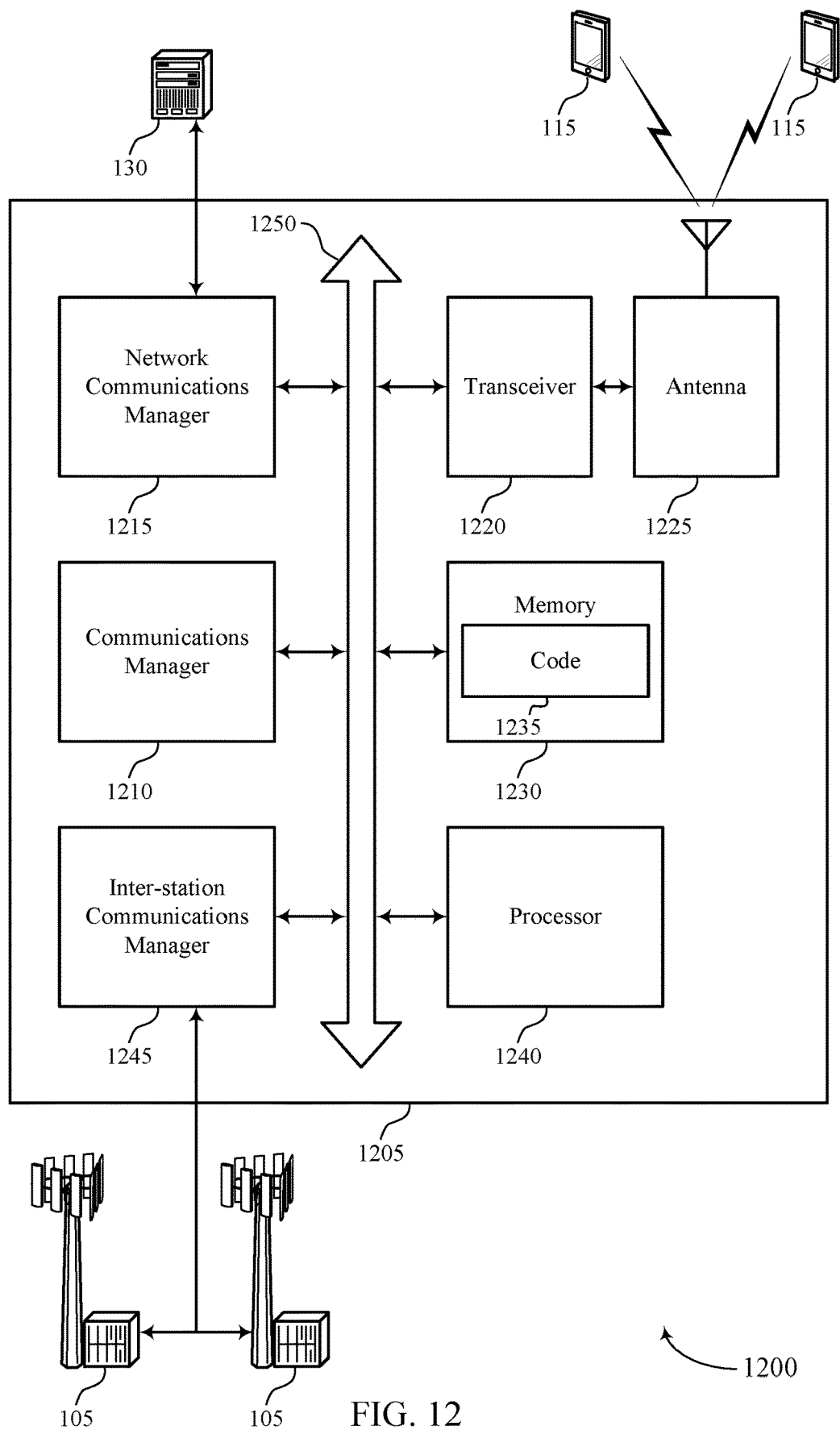
FIG. 12 shows a diagram of a system including a device that supports transmit power prioritization for multi-panel uplink transmission in accordance with aspects of the present disclosure.

FIG. 12 shows a diagram of a system 1200 including a device 1205 that supports transmit power prioritization for multi-panel uplink transmission in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine that a multi-panel uplink transmission is to be performed to the base station from a UE, the multi-panel uplink transmission using at least a first transmit panel and a second transmit panel of the UE, receive, according to the priority order, the multi-panel uplink transmission from the UE using at least the first transmit panel at a first transmit power and the second transmit panel at a second transmit power, the first transmit power and the second transmit power based on the available transmit power, identify a priority order for the UE to use for performing uplink transmissions of the multi-panel uplink transmission from the UE, the priority order including priority levels associated with the first transmit panel and the second transmit panel, and identify an available transmit power of the UE for the multi-panel uplink transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting transmit power prioritization for multi-panel uplink transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
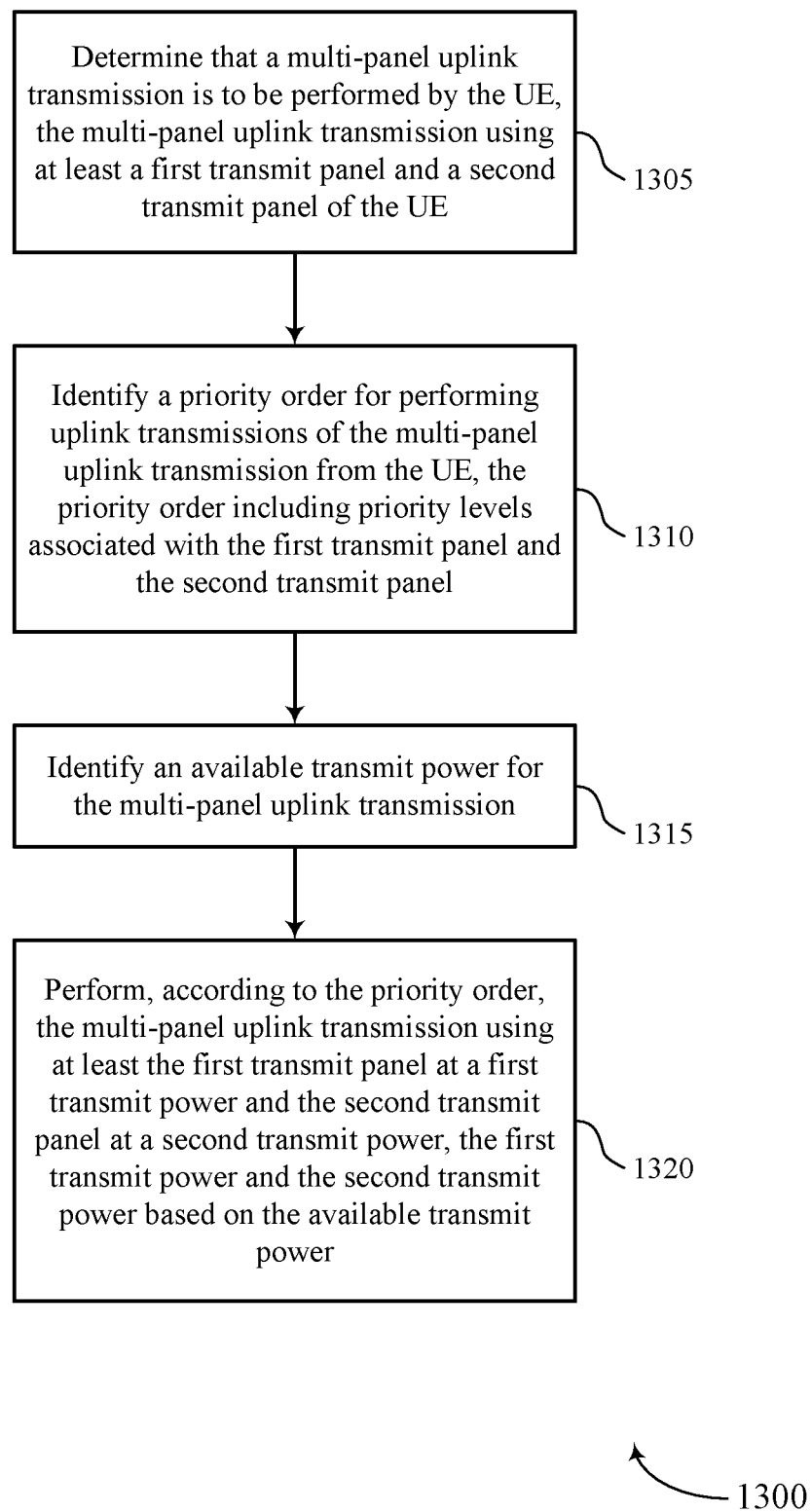
FIGS. 13 through 18 show flowcharts illustrating methods that support transmit power prioritization for multi-panel uplink transmission in accordance with aspects of the present disclosure.

FIG. 13 shows a flowchart illustrating a method 1300 that supports transmit power prioritization for multi-panel uplink transmission in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine that a multi-panel uplink transmission is to be performed by the UE, the multi-panel uplink transmission using at least a first transmit panel and a second transmit panel of the UE. The operations of 1305 may be performed according to the methods described herein. In some examples, aspects of the operations of 1305 may be performed by a multi-panel uplink transmission manager as described with reference to FIGS. 5 through 8.

At 1310, the UE may identify a priority order for performing uplink transmissions of the multi-panel uplink transmission from the UE, the priority order including priority levels associated with the first transmit panel and the second transmit panel. The operations of 1310 may be performed according to the methods described herein. In some examples, aspects of the operations of 1310 may be performed by a priority order manager as described with reference to FIGS. 5 through 8.

At 1315, the UE may identify an available transmit power for the multi-panel uplink transmission. The operations of 1315 may be performed according to the methods described herein. In some examples, aspects of the operations of 1315 may be performed by an available transmit power manager as described with reference to FIGS. 5 through 8.

At 1320, the UE may perform, according to the priority order, the multi-panel uplink transmission using at least the first transmit panel at a first transmit power and the second transmit panel at a second transmit power, the first transmit power and the second transmit power based on the available transmit power. The operations of 1320 may be performed according to the methods described herein. In some examples, aspects of the operations of 1320 may be performed by a multi-panel uplink transmission manager as described with reference to FIGS. 5 through 8.

Figure 14:
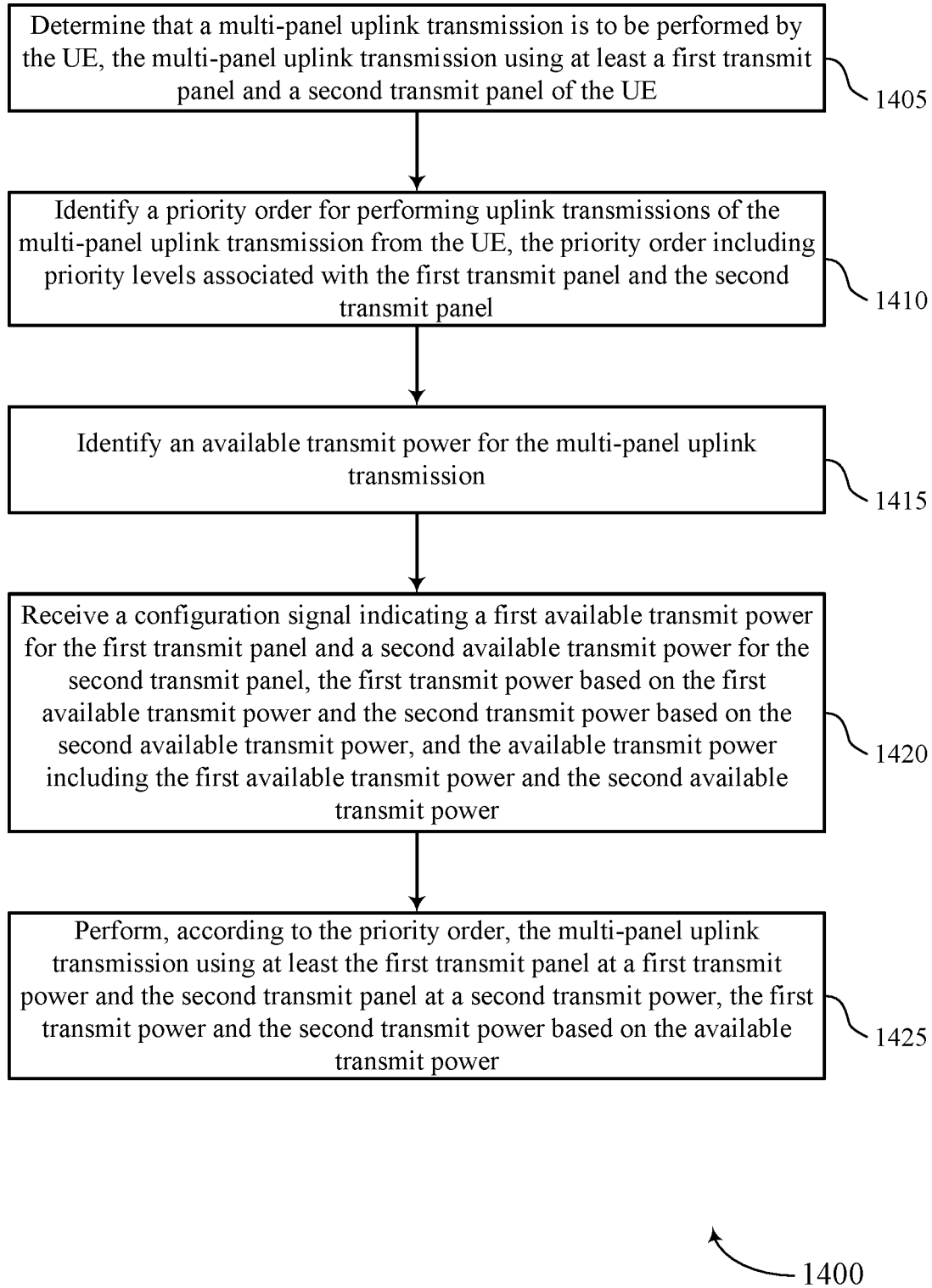

FIG. 14 shows a flowchart illustrating a method 1400 that supports transmit power prioritization for multi-panel uplink transmission in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine that a multi-panel uplink transmission is to be performed by the UE, the multi-panel uplink transmission using at least a first transmit panel and a second transmit panel of the UE. The operations of 1405 may be performed according to the methods described herein. In some examples, aspects of the operations of 1405 may be performed by a multi-panel uplink transmission manager as described with reference to FIGS. 5 through 8.

At 1410, the UE may identify a priority order for performing uplink transmissions of the multi-panel uplink transmission from the UE, the priority order including priority levels associated with the first transmit panel and the second transmit panel. The operations of 1410 may be performed according to the methods described herein. In some examples, aspects of the operations of 1410 may be performed by a priority order manager as described with reference to FIGS. 5 through 8.

At 1415, the UE may identify an available transmit power for the multi-panel uplink transmission. The operations of 1415 may be performed according to the methods described herein. In some examples, aspects of the operations of 1415 may be performed by an available transmit power manager as described with reference to FIGS. 5 through 8.

At 1420, the UE may receive a configuration signal indicating a first available transmit power for the first transmit panel and a second available transmit power for the second transmit panel, the first transmit power based on the first available transmit power and the second transmit power based on the second available transmit power, and the available transmit power including the first available transmit power and the second available transmit power. The operations of 1420 may be performed according to the methods described herein. In some examples, aspects of the operations of 1420 may be performed by a separate transmit power configuration manager as described with reference to FIGS. 5 through 8.

At 1425, the UE may perform, according to the priority order, the multi-panel uplink transmission using at least the first transmit panel at a first transmit power and the second transmit panel at a second transmit power, the first transmit power and the second transmit power based on the available transmit power. The operations of 1425 may be performed according to the methods described herein. In some examples, aspects of the operations of 1425 may be performed by a multi-panel uplink transmission manager as described with reference to FIGS. 5 through 8.

Figure 15:
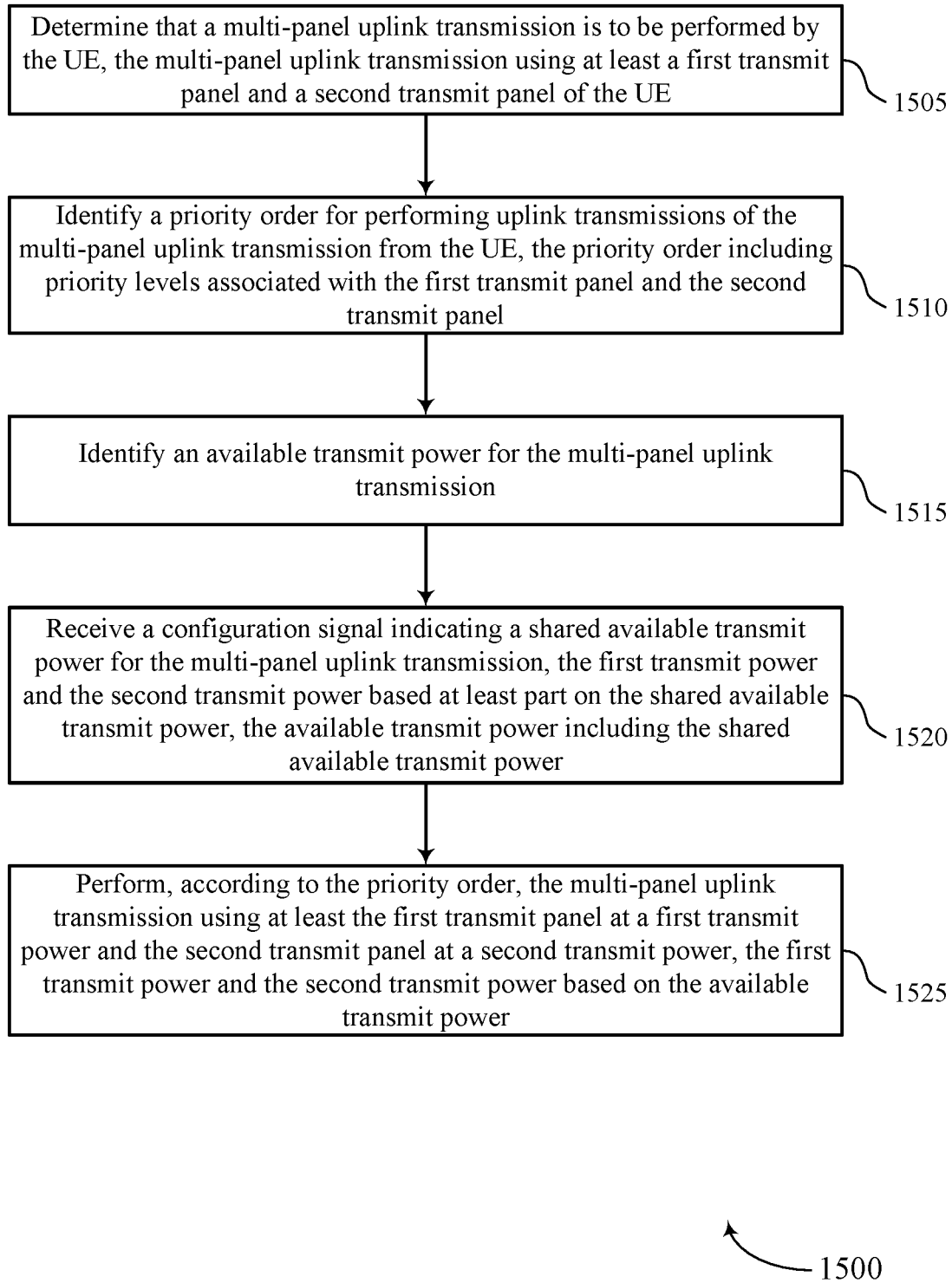

FIG. 15 shows a flowchart illustrating a method 1500 that supports transmit power prioritization for multi-panel uplink transmission in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may determine that a multi-panel uplink transmission is to be performed by the UE, the multi-panel uplink transmission using at least a first transmit panel and a second transmit panel of the UE. The operations of 1505 may be performed according to the methods described herein. In some examples, aspects of the operations of 1505 may be performed by a multi-panel uplink transmission manager as described with reference to FIGS. 5 through 8.

At 1510, the UE may identify a priority order for performing uplink transmissions of the multi-panel uplink transmission from the UE, the priority order including priority levels associated with the first transmit panel and the second transmit panel. The operations of 1510 may be performed according to the methods described herein. In some examples, aspects of the operations of 1510 may be performed by a priority order manager as described with reference to FIGS. 5 through 8.

At 1515, the UE may identify an available transmit power for the multi-panel uplink transmission. The operations of 1515 may be performed according to the methods described herein. In some examples, aspects of the operations of 1515 may be performed by an available transmit power manager as described with reference to FIGS. 5 through 8.

At 1520, the UE may receive a configuration signal indicating a shared available transmit power for the multi-panel uplink transmission, the first transmit power and the second transmit power based at least part on the shared available transmit power, the available transmit power including the shared available transmit power. The operations of 1520 may be performed according to the methods described herein. In some examples, aspects of the operations of 1520 may be performed by a combined transmit power configuration manager as described with reference to FIGS. 5 through 8.

At 1525, the UE may perform, according to the priority order, the multi-panel uplink transmission using at least the first transmit panel at a first transmit power and the second transmit panel at a second transmit power, the first transmit power and the second transmit power based on the available transmit power. The operations of 1525 may be performed according to the methods described herein. In some examples, aspects of the operations of 1525 may be performed by a multi-panel uplink transmission manager as described with reference to FIGS. 5 through 8.

Figure 16:
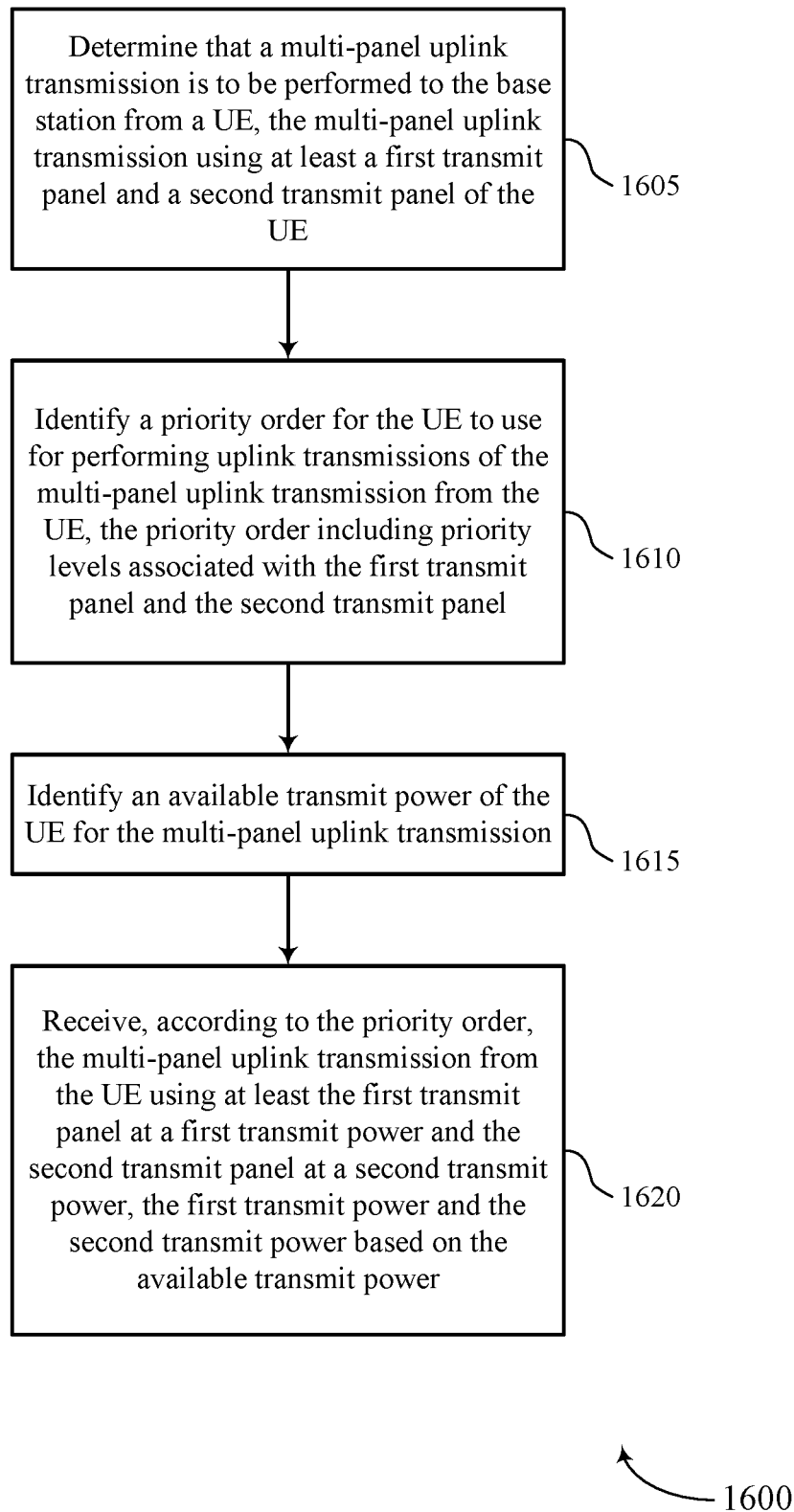

FIG. 16 shows a flowchart illustrating a method 1700 that supports transmit power prioritization for multi-panel uplink transmission in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may determine that a multi-panel uplink transmission is to be performed to the base station from a UE, the multi-panel uplink transmission using at least a first transmit panel and a second transmit panel of the UE. The operations of 1705 may be performed according to the methods described herein. In some examples, aspects of the operations of 1705 may be performed by a multi-panel uplink transmission manager as described with reference to FIGS. 9 through 12.

At 1710, the base station may identify a priority order for the UE to use for performing uplink transmissions of the multi-panel uplink transmission from the UE, the priority order including priority levels associated with the first transmit panel and the second transmit panel. The operations of 1710 may be performed according to the methods described herein. In some examples, aspects of the operations of 1710 may be performed by a priority order manager as described with reference to FIGS. 9 through 12.

At 1715, the base station may identify an available transmit power of the UE for the multi-panel uplink transmission. The operations of 1715 may be performed according to the methods described herein. In some examples, aspects of the operations of 1715 may be performed by an available transmit power manager as described with reference to FIGS. 9 through 12.

At 1720, the base station may receive, according to the priority order, the multi-panel uplink transmission from the UE using at least the first transmit panel at a first transmit power and the second transmit panel at a second transmit power, the first transmit power and the second transmit power based on the available transmit power. The operations of 1720 may be performed according to the methods described herein. In some examples, aspects of the operations of 1720 may be performed by a multi-panel uplink transmission manager as described with reference to FIGS. 9 through 12.

Figure 17:
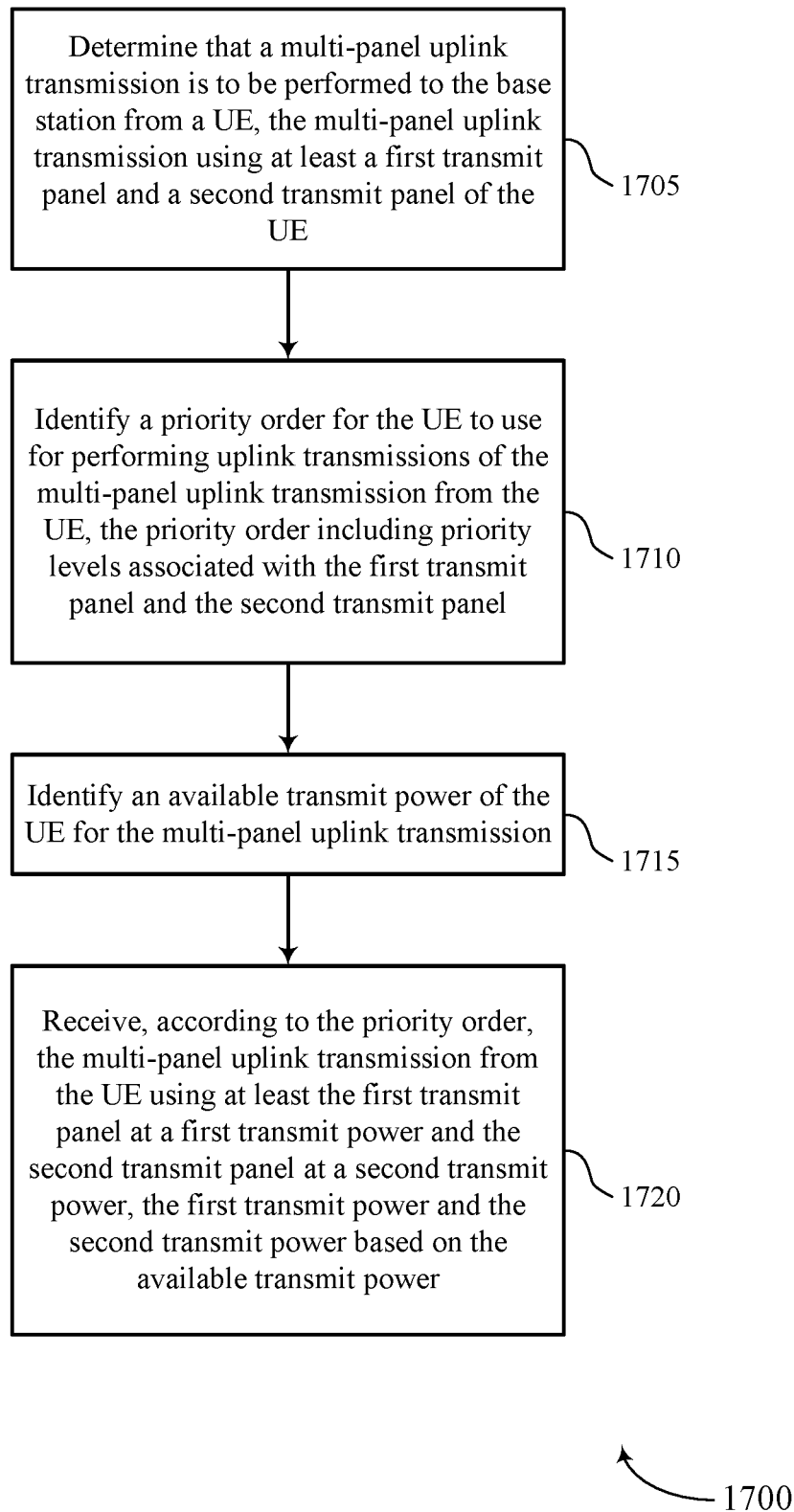

FIG. 17 shows a flowchart illustrating a method 1700 that supports transmit power prioritization for multi-panel uplink transmission in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may determine that a multi-panel uplink transmission is to be performed to the base station from a UE, the multi-panel uplink transmission using at least a first transmit panel and a second transmit panel of the UE. The operations of 1705 may be performed according to the methods described herein. In some examples, aspects of the operations of 1705 may be performed by a multi-panel uplink transmission manager as described with reference to FIGS. 9 through 12.

At 1710, the base station may identify a priority order for the UE to use for performing uplink transmissions of the multi-panel uplink transmission from the UE, the priority order including priority levels associated with the first transmit panel and the second transmit panel. The operations of 1710 may be performed according to the methods described herein. In some examples, aspects of the operations of 1710 may be performed by a priority order manager as described with reference to FIGS. 9 through 12.

At 1715, the base station may identify an available transmit power of the UE for the multi-panel uplink transmission. The operations of 1715 may be performed according to the methods described herein. In some examples, aspects of the operations of 1715 may be performed by an available transmit power manager as described with reference to FIGS. 9 through 12.

At 1720, the base station may receive, according to the priority order, the multi-panel uplink transmission from the UE using at least the first transmit panel at a first transmit power and the second transmit panel at a second transmit power, the first transmit power and the second transmit power based on the available transmit power. The operations of 1720 may be performed according to the methods described herein. In some examples, aspects of the operations of 1720 may be performed by a multi-panel uplink transmission manager as described with reference to FIGS. 9 through 12.

Figure 18:
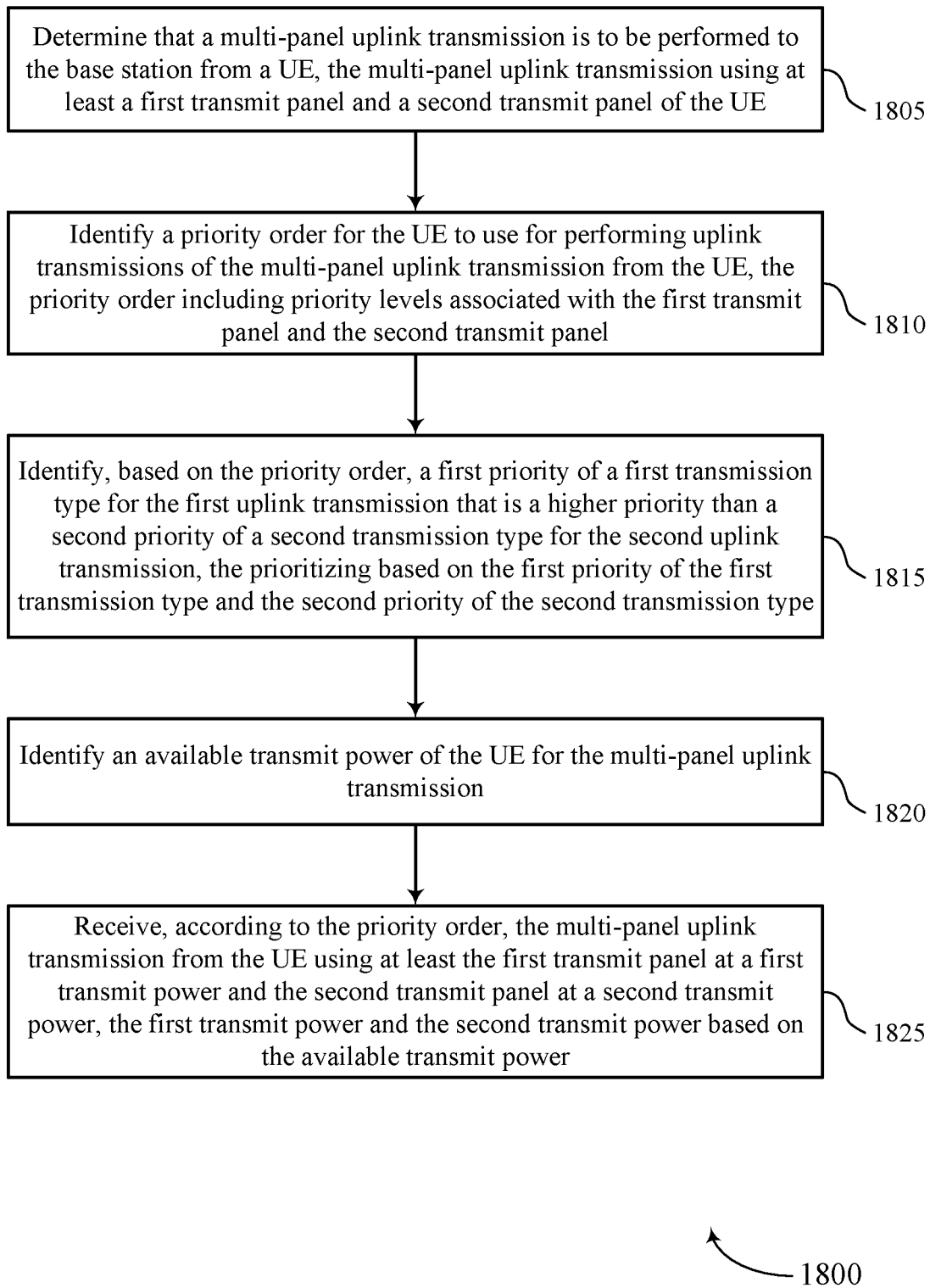

FIG. 18 shows a flowchart illustrating a method 1800 that supports transmit power prioritization for multi-panel uplink transmission in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may determine that a multi-panel uplink transmission is to be performed to the base station from a UE, the multi-panel uplink transmission using at least a first transmit panel and a second transmit panel of the UE. The operations of 1805 may be performed according to the methods described herein. In some examples, aspects of the operations of 1805 may be performed by a multi-panel uplink transmission manager as described with reference to FIGS. 9 through 12.

At 1810, the base station may identify a priority order for the UE to use for performing uplink transmissions of the multi-panel uplink transmission from the UE, the priority order including priority levels associated with the first transmit panel and the second transmit panel. The operations of 1810 may be performed according to the methods described herein. In some examples, aspects of the operations of 1810 may be performed by a priority order manager as described with reference to FIGS. 9 through 12.

At 1815, the base station may identify, based on the priority order, a first priority of a first transmission type for the first uplink transmission that is a higher priority than a second priority of a second transmission type for the second uplink transmission, the prioritizing based on the first priority of the first transmission type and the second priority of the second transmission type. The operations of 1815 may be performed according to the methods described herein. In some examples, aspects of the operations of 1815 may be performed by an uplink transmission manager as described with reference to FIGS. 9 through 12.

At 1820, the base station may identify an available transmit power of the UE for the multi-panel uplink transmission. The operations of 1820 may be performed according to the methods described herein. In some examples, aspects of the operations of 1820 may be performed by an available transmit power manager as described with reference to FIGS. 9 through 12.

At 1825, the base station may receive, according to the priority order, the multi-panel uplink transmission from the UE using at least the first transmit panel at a first transmit power and the second transmit panel at a second transmit power, the first transmit power and the second transmit power based on the available transmit power. The operations of 1825 may be performed according to the methods described herein. In some examples, aspects of the operations of 1825 may be performed by a multi-panel uplink transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining that a multi-panel uplink transmission is to be performed by the UE, the multi-panel uplink transmission using at least a first transmit panel and a second transmit panel of the UE;
    identifying a priority order for performing uplink transmissions of the multi-panel uplink transmission from the UE, the priority order including priority levels associated with the first transmit panel and the second transmit panel;
    identifying an available transmit power for the multi-panel uplink transmission;
    performing, according to the priority order, the multi-panel uplink transmission using at least the first transmit panel at a first transmit power and the second transmit panel at a second transmit power, the first transmit power and the second transmit power based at least in part on the available transmit power;
    receiving a configuration signal indicating a first available transmit power for the first transmit panel and a second available transmit power for the second transmit panel, the first transmit power based at least in part on the first available transmit power and the second transmit power based at least in part on the second available transmit power, and the available transmit power comprising the first available transmit power and the second available transmit power; and
    determining that the first transmit power exceeds the first available transmit power for the first transmit panel;
    identifying that a first priority of a first transmission type for the first uplink transmission on the first transmit panel is a higher priority than a second priority of a second transmission type for a second uplink transmission on the first transmit panel; and
    transmitting the first transmission type of the first uplink transmission on the first transmit panel and dropping the second uplink transmission on the first transmit panel.

2. The method of claim 1, wherein the configuration signal is received in a transmission from a base station to the UE or a signal transmitted from an upper layer of the UE to a lower layer of the UE.

3. The method of claim 1, further comprising:
    receiving a configuration signal indicating a shared available transmit power for the multi-panel uplink transmission, the first transmit power and the second transmit power based at least part on the shared available transmit power, the available transmit power comprising the shared available transmit power.

4. The method of claim 3, further comprising:
    transmitting, based at least in part on the shared available transmit power, a first uplink transmission of the multi-panel uplink transmission on the first transmit panel using the first transmit power and a second uplink transmission of the multi-panel uplink transmission on the second transmit panel using the second transmit power.

5. The method of claim 4, further comprising:
    identifying, based at least in part on the priority order, that a first priority of the first transmit panel is a higher priority than a second priority of the second transmit panel, wherein the prioritizing is based at least in part on the first priority of the first transmit panel being a higher priority than the second priority of the second transmit panel.

6. The method of claim 4, further comprising:
    identifying a first identifier for the first transmit panel and a second identifier for the second transmit panel, wherein the prioritizing of the first uplink transmission on the first transmit panel is based at least in part on the first identifier for the first transmit panel being associated with a higher priority than the second identifier for the second transmit panel.

7. The method of claim 6, further comprising:
    identifying, based at least in part on the priority order, a first priority of a first transmission type for the first uplink transmission on the first transmit panel that is a higher priority than a second priority of a second transmission type for a first uplink transmission on the first transmit panel, the prioritizing based at least in part on the first priority of the first transmission type being a higher priority than the second priority of the second transmission type.

8. The method of claim 3, wherein the configuration signal is received in a transmission from a base station to the UE or a signal transmitted from an upper layer of the UE to a lower layer of the UE.

9. The method of claim 1, further comprising:
    transmitting, based at least in part on the priority order, a first uplink transmission of the multi-panel uplink transmission on the first transmit panel using the first transmit power and a second uplink transmission of the multi-panel uplink transmission on the second transmit panel using the second transmit power.

10. The method of claim 9, further comprising:
    identifying, based at least in part on the priority order, a first priority of the first uplink transmission that is a higher priority than a second priority of the second uplink transmission, the prioritizing based at least in part on the first priority of the first uplink transmission and the second priority of the second uplink transmission.

11. The method of claim 9, further comprising:
    identifying a first identifier for the first transmit panel that is associated with a first priority and a second identifier for the second transmit panel that is associated with a second priority, the first priority being a higher priority than the second priority;

identifying a first transmission type for the first uplink transmission on the first transmit panel and a second transmission type for the second uplink transmission on the second transmit panel, the first transmission type associated with a lower priority than the second transmission type; and transmitting, based at least in part on the lower priority of the second transmission type, the second transmission type for the second uplink transmission on the second transmit panel and dropping the first transmission type for the first uplink transmission on the first transmit panel.

12. The method of claim 1, further comprising:
identifying, based at least in part on the priority order, a first priority of a first transmission type for the first uplink transmission that is a higher priority than a second priority of a second transmission type for the second uplink transmission, the prioritizing based at least in part on the first priority of the first transmission type and the second priority of the second transmission type.

13. The method of claim 12, further comprising:
identifying a first identifier for the first transmit panel that is associated with a first priority and a second identifier for the second transmit panel that is associated with a second priority, the first priority being a higher priority than the second priority;

identifying a first transmission type for the first uplink transmission on the first transmit panel and a second transmission type for the second uplink transmission on the second transmit panel, the first transmission type associated with a lower priority than the second transmission type; and transmitting, based at least in part on the lower priority of the second transmission type, the second transmission type for the second uplink transmission on the second transmit panel and dropping the first transmission type for the first uplink transmission on the first transmit panel.

14. The method of claim 1, wherein the multi-panel uplink transmission comprises one or more of a sounding reference signal (SRS) transmission, a physical uplink control channel (PUCCH) transmission, a physical uplink shared channel (PUSCH) transmission, a physical random access channel (PRACH) transmission, or a combination thereof.

15. The method of claim 14, wherein the PUCCH transmission indicates at least one of a hybrid automatic repeat/request acknowledgement (HARQ-ACK) information, a scheduling request (SR), a channel state information (CSI), a long-range radar (LRR) information, of a combination thereof, and the PUSCH transmission comprises at least of the CSI, the HARQ-ACK information, or a combination thereof.

16. The method of claim 1, wherein performing the multi-panel uplink transmission comprises:
transmitting a first uplink transmission of the multi-panel uplink transmission using the first transmit panel of the UE and a second uplink transmission of the multi-panel uplink transmission using the second transmit panel of the UE.

17. The method of claim 1, wherein receiving the multi-panel uplink transmission comprises:
receiving a first uplink transmission of the multi-panel uplink transmission using the first transmit panel of the UE and a second uplink transmission of the multi-panel uplink transmission using the second transmit panel of the UE.

18. A method for wireless communication at a base station, comprising:
determining that a multi-panel uplink transmission is to be performed to the base station from a user equipment (UE), the multi-panel uplink transmission using at least a first transmit panel and a second transmit panel of the UE;

identifying a priority order for the UE to use for performing uplink transmissions of the multi-panel uplink transmission from the UE, the priority order including priority levels associated with the first transmit panel and the second transmit panel;

identifying an available transmit power of the UE for the multi-panel uplink transmission;

identifying, based at least in part on the priority order, a first priority of a first transmission type for the first uplink transmission that is a higher priority than a second priority of a second transmission type for the second uplink transmission, the prioritizing based at least in part on the first priority of the first transmission type and the second priority of the second transmission type; and receiving, according to the priority order, the multi-panel uplink transmission from the UE using at least the first transmit panel at a first transmit power and the second transmit panel at a second transmit power, the first transmit power and the second transmit power based at least in part on the available transmit power.

19. The method of claim 18, further comprising:
transmitting a configuration signal indicating a first available transmit power for the first transmit panel and a second available transmit power for the second transmit panel, the first transmit power based at least in part on the first available transmit power and the second transmit power based at least in part on the second available transmit power, and the available transmit power comprising the first available transmit power and the second available transmit power.

20. The method of claim 18, further comprising:
transmitting a configuration signal indicating a shared available transmit power for the multi-panel uplink transmission, the first transmit power and the second transmit power based at least part on the shared available transmit power, the available transmit power comprising the shared available transmit power.

21. The method of claim 18, further comprising:
receiving, based at least in part on the priority order, a first uplink transmission of the multi-panel uplink transmission on the first transmit panel using the first transmit power and a second uplink transmission of the multi-panel uplink transmission on the second transmit panel using the second transmit power.

22. An apparatus for wireless communication at a user equipment (UE), comprising:
a processor,
memory coupled with the processor; and
instructions stored in the memory and executable by the processor to cause the apparatus to:
determine that a multi-panel uplink transmission is to be performed by the UE, the multi-panel uplink transmission using at least a first transmit panel and a second transmit panel of the UE;
identify a priority order for performing uplink transmissions of the multi-panel uplink transmission from the UE, the priority order including priority levels associated with the first transmit panel and the second transmit panel;

identify an available transmit power for the multi-panel uplink transmission;

identify, based at least in part on the priority order, a first priority of a first transmission type for the first uplink transmission that is a higher priority than a second priority of a second transmission type for the second uplink transmission, the prioritizing based at least in part on the first priority of the first transmission type and the second priority of the second transmission type; and perform, according to the priority order, the multi-panel uplink transmission using at least the first transmit panel at a first transmit power and the second transmit panel at a second transmit power, the first transmit power and the second transmit power based at least in part on the available transmit power.

23. The apparatus of claim 22, wherein the instructions are further executable by the processor to cause the apparatus to:

receive a configuration signal indicating a first available transmit power for the first transmit panel and a second available transmit power for the second transmit panel, the first transmit power based at least in part on the first available transmit power and the second transmit power based at least in part on the second available transmit power, and the available transmit power comprising the first available transmit power and the second available transmit power.

24. The apparatus of claim 22, wherein the instructions are further executable by the processor to cause the apparatus to:

receive a configuration signal indicating a shared available transmit power for the multi-panel uplink transmission, the first transmit power and the second transmit power based at least part on the shared available transmit power, the available transmit power comprising the shared available transmit power.

25. The apparatus of claim 22, wherein the instructions are further executable by the processor to cause the apparatus to:

transmit, based at least in part on the priority order, a first uplink transmission of the multi-panel uplink transmission on the first transmit panel using the first transmit power and a second uplink transmission of the multi-panel uplink transmission on the second transmit panel using the second transmit power.

26. An apparatus for wireless communication at a base station, comprising:

a processor, memory coupled with the processor; and instructions stored in the memory and executable by the processor to cause the apparatus to:

determine that a multi-panel uplink transmission is to be performed to the base station from a user equipment (UE), the multi-panel uplink transmission using at least a first transmit panel and a second transmit panel of the UE;

identify a priority order for the UE to use for performing uplink transmissions of the multi-panel uplink transmission from the UE, the priority order including priority levels associated with the first transmit panel and the second transmit panel;

identify an available transmit power of the UE for the multi-panel uplink transmission;

identify, based at least in part on the priority order, a first priority of a first transmission type for the first uplink transmission that is a higher priority than a second priority of a second transmission type for the second uplink transmission, the prioritizing based at least in part on the first priority of the first transmission type and the second priority of the second transmission type; and receive, according to the priority order, the multi-panel uplink transmission from the UE using at least the first transmit panel at a first transmit power and the second transmit panel at a second transmit power, the first transmit power and the second transmit power based at least in part on the available transmit power.

27. The apparatus of claim 26, wherein the instructions are further executable by the processor to cause the apparatus to:

transmit a configuration signal indicating a first available transmit power for the first transmit panel and a second available transmit power for the second transmit panel, the first transmit power based at least in part on the first available transmit power and the second transmit power based at least in part on the second available transmit power, and the available transmit power comprising the first available transmit power and the second available transmit power.

28. The apparatus of claim 26, wherein the instructions are further executable by the processor to cause the apparatus to:

transmit a configuration signal indicating a shared available transmit power for the multi-panel uplink transmission, the first transmit power and the second transmit power based at least part on the shared available transmit power, the available transmit power comprising the shared available transmit power.

29. The apparatus of claim 26, wherein the instructions are further executable by the processor to cause the apparatus to:

receive, based at least in part on the priority order, a first uplink transmission of the multi-panel uplink transmission on the first transmit panel using the first transmit power and a second uplink transmission of the multi-panel uplink transmission on the second transmit panel using the second transmit power.

* * * * *